US007636335B2

(12) United States Patent
Rune et al.

(10) Patent No.: US 7,636,335 B2
(45) Date of Patent: Dec. 22, 2009

(54) ARRANGEMENTS AND METHOD FOR HANDLING MACRO DIVERSITY IN A UNIVERSAL MOBILE TELECOMMUNICATIONS SYSTEM

(75) Inventors: Johan Rune, Terrängvägen (SE); Lars Westberg, Långtora Grän (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 83 days.

(21) Appl. No.: 10/584,467

(22) PCT Filed: Mar. 30, 2004

(86) PCT No.: PCT/SE2004/000478

§ 371 (c)(1),
(2), (4) Date: Jun. 22, 2006

(87) PCT Pub. No.: WO2005/062654

PCT Pub. Date: Jul. 7, 2005

(65) Prior Publication Data

US 2007/0081493 A1   Apr. 12, 2007

(30) Foreign Application Priority Data

Dec. 22, 2003   (SE) .................................... 0303463

(51) Int. Cl.
*H04Q 7/00* (2006.01)
(52) U.S. Cl. ....................................... 370/331; 455/436
(58) Field of Classification Search ........................ None
See application file for complete search history.

(56) References Cited

U.S. PATENT DOCUMENTS 5,539,922 A    7/1996   Wang (Continued)

FOREIGN PATENT DOCUMENTS

JP            1 014 627 A1    6/2000

(Continued)

OTHER PUBLICATIONS

International Search Report of PCT/SE2004/000478, mailed Sep. 24, 2004.

(Continued)

*Primary Examiner*—Lester Kincaid
*Assistant Examiner*—Phuoc Doan
(74) *Attorney, Agent, or Firm*—Nixon & Vanderhye P.C.

(57) ABSTRACT

The present invention relates to methods and arrangements for selecting one or more Diversity Handover (DHO) nodes, such as a Node B or a Radio Network Controller (RNC) executing a macro diversity functionality, in a mobile telecommunication system wherein the macro diversity functionality is distributed to one or a plurality of DHO nodes such as a RNC and its connected Node B(s) in said network. The method comprises the steps of: a. -obtaining topology information comprising a hop-by-hop route from the RNC to each of its connected Node Bs and at least one metric for each hop in the route, and b. -using an algorithm for selecting one or more DHO node(s), whereby the algorithm comprises the steps of: -forming a macro diversity tree of the routes by means of the obtained topology information, and—selecting the Node B(s) and/or the RNC and/or other DHO enabled node(s), resulting in the best accumulated metric for all potential data flows between the RNC and its connected Node B(s) in the macro diversity tree of routes, as the DHO node(s).

55 Claims, 18 Drawing Sheets

U.S. PATENT DOCUMENTS

| | | |
|---|---|---|
| 6,321,271 B1 | 11/2001 | Kodialam et al. |
| 6,687,249 B1 | 2/2004 | Noguera-Rodriguez et al. |
| 7,171,206 B2 | 1/2007 | Wu |
| 2001/0053145 A1 | 12/2001 | Willars et al. |
| 2002/0082015 A1* | 6/2002 | Wu ............................ 455/436 |
| 2002/0183053 A1 | 12/2002 | Gopalakrishna et al. |
| 2003/0003919 A1 | 1/2003 | Beming et al. |
| 2003/0099255 A1 | 5/2003 | Kekki et al. |
| 2004/0029615 A1 | 2/2004 | Gerry et al. |
| 2004/0203640 A1 | 10/2004 | Molander et al. |

FOREIGN PATENT DOCUMENTS

| | | |
|---|---|---|
| JP | 2000-196650 | 7/2002 |
| JP | 2003-258704 | 9/2003 |
| WO | 03017686 A2 | 2/2003 |
| WO | 03049482 A1 | 6/2003 |
| WO | 03096632 A1 | 11/2003 |
| WO | 03096733 A1 | 11/2003 |
| WO | WO 03/096733 * | 11/2003 |
| WO | WO 03/096733 A1 | 11/2003 |

OTHER PUBLICATIONS

International Search Report for PCT/SE2004/000482 dated Sep. 24, 2004.

Marchent et al., *Support of Mobile Multimedia over Radio for a Range of QoS and Traffic Profiles*, Vehicular Technology Conference, 1999 IEEE 49$^{th}$, vol. 2, May 16-20, 1999, pp. 1540-1544.

Nakano et al., *Performance of Diversity Handover in DS-CDMA Cellular Systems*, Universal Personal Communications, 1995 Fourth IEEE International Conference, Nov. 6-10, 1995.

* cited by examiner

ARRANGEMENTS AND METHOD FOR HANDLING MACRO DIVERSITY IN A UNIVERSAL MOBILE TELECOMMUNICATIONS SYSTEM

This application is the US national phase of international application PCT/SE2004/000478, filed 30 Mar. 2004, which designated the U.S. and claims priority of SE 0303463-4, filed 22 Dec. 2003, the entire contents of each of which are hereby incorporated by reference.

TECHNICAL FIELD

The technical field of the disclosure relates to arrangements and a method in a third generation mobile telecommunication system and evolved variants thereof. In particular, the technical field relates to arrangements and a method for handling macro diversity in a UMTS Radio Access Network (UTRAN).

BACKGROUND

Third generation (3G) mobile communication systems (e.g. Universal Mobile Telecommunications System (UMTS)) shall offer high quality voice and data services for mobile users. The systems shall also provide high capacity and universal coverage. In some situations that may however be difficult to fulfill, due to unreliable radio channels. One promising technique to combat link reliability problems over the radio interface is macro diversity techniques. Macro diversity should however also be seen as an inherent consequence of using Code Division Multiple Access (CDMA) as the multiple access technique in a cellular network. CDMA is an interference limited technology. That is, it is the interference in a cell that sets the upper limit for the cell's capacity. To keep the interference as low as possible it is essential that the base station controls the output power of the radio transmitters of the mobile terminals in the cell, i.e. fast and efficient power control is essential. As a mobile terminal moves towards the periphery of a cell it has to increase the power of its radio transmission in order for the base station to be able to receive the transmitted signal. Likewise, the base station has to increase the power of its radio transmission towards the mobile terminal. This power increase has a deteriorating effect on the capacity of both the mobile terminal's own cell and the neighbouring cell(s) which the mobile terminal is close to. Macro diversity is used to mitigate this effect. When the mobile terminal communicates via more than one base station, the quality of the communication can be maintained with a lower radio transmission power than when only a single base station is used. Thus, macro diversity is both a feature raising the quality of unreliable radio channels and a necessity that is required in order to overcome an inherent weakness of CDMA based cellular systems.

FIG. 1 illustrates a UTRAN. The Radio Network Controller (RNC) 102 is connected to the Core Network 100 that in turn may be connected to another network. The RNC 102 is connected to one or more Node Bs 104 also denoted base stations via a transport network 106. The transport network 106 may e.g. be IP-based or ATM-based. The transport network nodes 108 are indicated with a "T" in FIG. 1. In an IP based transport network these nodes are IP routers. In an ATM based transport network the transport network nodes are AAL2 (ATM Adaptation Layer type 2) switches. The Node Bs 104 may be wirelessly connected to one or several User Equipments (UEs) 110 also denoted mobile terminals. A Serving-RNC (S-RNC) 102 is a RNC that has a Radio Resource Connection (RRC) connection with the UE 110. A Drift-RNC (D-RNC) 112 is a RNC that may be connected to a UE 110, but where another RNC 102, i.e. the S-RNC, handles the RRC connection with the UE 110.

Macro diversity enables a mobile station to communicate with a fixed network by more than one radio link, i.e. a mobile terminal can send/receive information towards/from more than one radio port (or base station also denoted Node B). The radio ports (RPs) are spatially separated at distance from a short distance, e.g. between different floors in a building, (pico-cells) up to about some kilometers (micro- and macro-cells). As the propagation conditions between the mobile terminal and the different RPs, are different at the same moment in time, the resulting quality of the combination of the received signals is often better than the quality of each individual signal. Thus, macro diversity can improve radio link quality. When a mobile terminal is connected to more than one base station simultaneously, the UE is said to be in soft handover.

Macro diversity is applicable only to dedicated channels (DCH). Currently all the macro diversity functionality resides in the RNC provided that the corresponding functionality for softer handover in Node B is not considered. Softer handover implies that a UE has two or more radio links to the same Node B. The softer handover combining performed in the uplink in the Node B is more advanced than the selective combining performed in the RNC. In the downlink, the splitting is performed in the RNC, which ensures that a copy of each downlink DCH FP frame is sent through each leg in the active set of the concerned DCH. Both DCH FP data frames and DCH FP control frames are subject to the splitting function.

In the uplink, the RNC performs the combining, which is more complicated than, the splitting. Only DCH FP data frames are subject to the combining procedure. DCH FP control frames are not combined, since each uplink DCH FP control frame includes control data that is specific for an individual Node B. For the uplink, the RNC has a time window in which all legs are expected to deliver their contribution to the combining (i.e a DCH FP frame with a certain Connection Frame Number (CFN)). At the expiration of the time window, all the DCH FP frames with the correct CFN that were received within the time window are passed to the combining function.

The actual combining is a selection of the best piece of data out of the candidates that were received through the different legs. For non-voice DCHs, the unit of selection is a transport block (TB). To determine which of the candidates to select for a certain transport block, the Cyclic Redundancy Checksum Indicator (CRCI) for the concerned TB is checked in each of the delivered frames. If one and only one of them indicates that the TB was correctly received at the Node B (i.e. that the CRC check was successful for the concerned TB when it was received by the Node B), this TB is selected. Otherwise, if more than one of the CRCIs indicate successful CRC check, the combining function selects the one of these TBs that belongs to the frame with the greatest Quality Estimate (QE) parameter. The QE parameter is a measure of the current bit error rate over the radio interface. Likewise, if all of the CRCIs indicate unsuccessful CRC check, the combining function selects the TB from the frame with the greatest QE parameter. If in the two latter cases, the greatest QE parameter value is found in two or more of the frames (i.e. if these QE parameters are equal too), the selection of TB is implementation dependent. FIG. 2 illustrates the combining procedure for non-voice DCHs.

For voice DCHs, the combining works slightly differently. The Adaptive Multi Rate (AMR) speech codec produces three subflows, wherein each are transported in a respective DCH. These three DCHs are so-called coordinated DCHs. The coordinated DCHs are included in the same DCH FP frame and there is only one TB for each subflow in a frame. During the combining, the combining function does not select separate TBs from different candidate frames to create a new combined frame as described above in the context of non-voice DCHs. Instead it selects one entire frame based on the CRCI for the TB associated with subflow 1, which is the most significant subflow. The CRCI of the other subflows are insignificant, since these subflows are not CRC protected over the radio interface. Again, if the CRCIs indicated unsuccessful CRC check or because all of the concerned CRCIs indicate unsuccessful CRC check, the frame with the greatest QE parameter is selected. FIG. 3 illustrates the combining procedure for voice DCHs.

Hence macro diversity in current UTRANs is realised through macro diversity functionality, also denoted as Diversity Handover (DHO) functionality in the RNCs. The current standards allow DHO functionality in both the Serving RNC (S-RNC) and the D-RNC, but the possibility to locate the DHO functionality in the D-RNC is commonly not used.

Thus, a problem in the existing macro diversity solutions is that the split downlink flows and the uncombined uplink flows of user data are transported all the way between the RNC and the Node B. That results in that costly transmission resources are consumed in the UTRAN transport network, which also results in significant costs for the operators.

SUMMARY

The consumed transmission resources are reduced in one or more embodiments of the present invention by distributing the macro diversity functionality to the Node Bs. A problem is then how to select which of the connected Node Bs that should be selected to perform the combining/splitting function, also referred to as a Diversity Handover (DHO) function. These selected nodes are referred to as DHO nodes. The DHO nodes are selected out of those Node Bs that are able to perform the DHO functionality, i.e. out of those Node Bs that have been adapted with DHO functionality. These nodes are referred to as DHO enabled nodes or macro diversity enabled nodes.

An advantage achieved is transmission savings in the UTRAN transport network, which translate into significant cost savings for the operator. The transmission savings are realised through optimised location the DHO functionality. Thereby the redundant data transport is eliminated in the parts of the path, where data pertaining to different macro diversity legs of the same DCH would otherwise be transported in parallel along the same route.

Another advantage is that RNCs may be located in more central locations of the network (i.e. with less geographical distribution). A goal of the current common geographical distribution of RNCs is to limit the transmission costs for the parallel macro diversity legs. When this parallel data transport is eliminated, it becomes more beneficial for an operator to centralise the RNCs, e.g. by co-locating them with MSCs or MGWs. Co-locating several nodes on the same site results in simplified operation and maintenance, which also means reduced costs for the operator.

DETAILED DESCRIPTION

Figure 1:
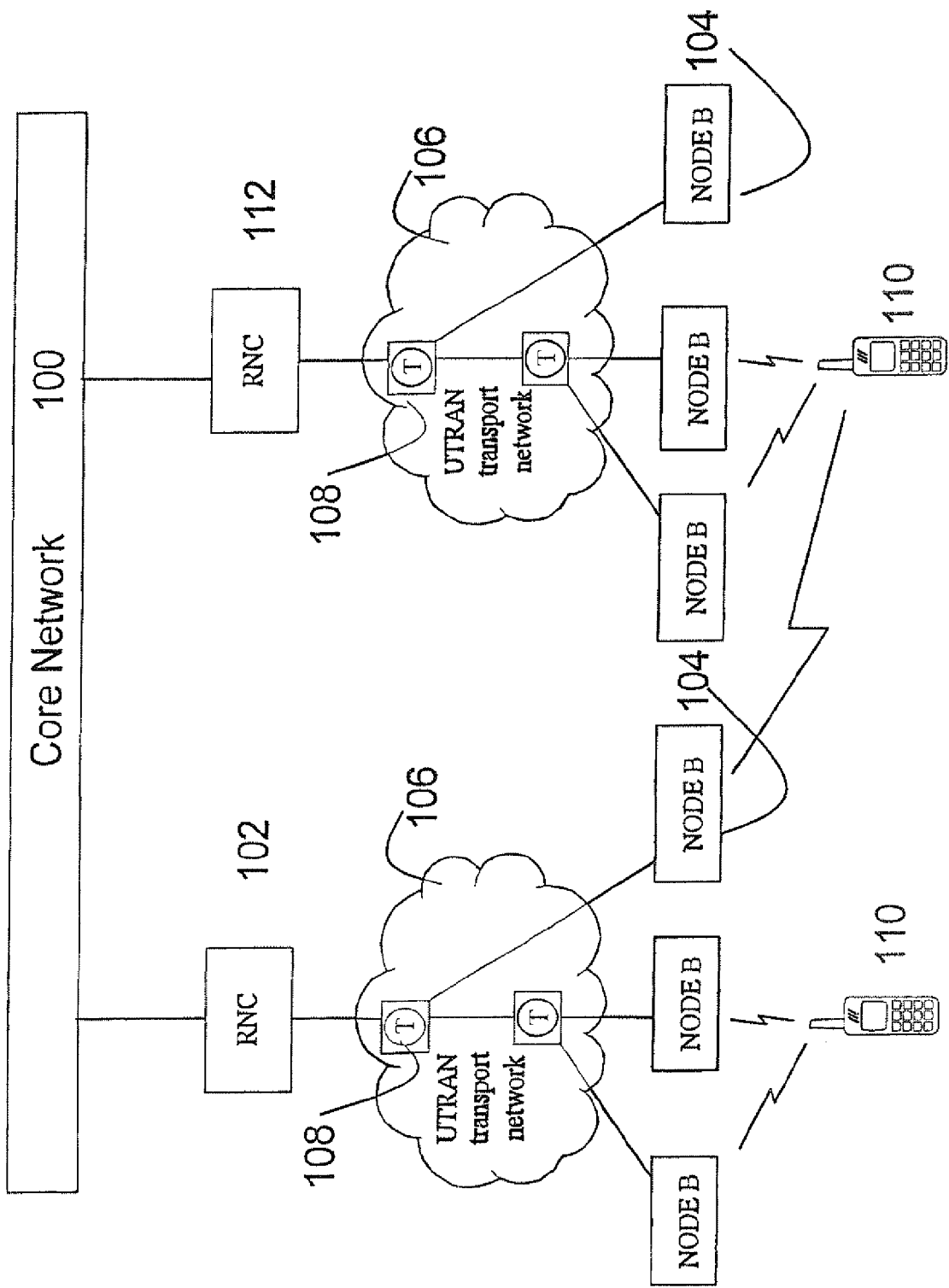
FIG. 1 is a schematic illustration of a UMTS Terrestrial Radio Access Network
Figure 2:
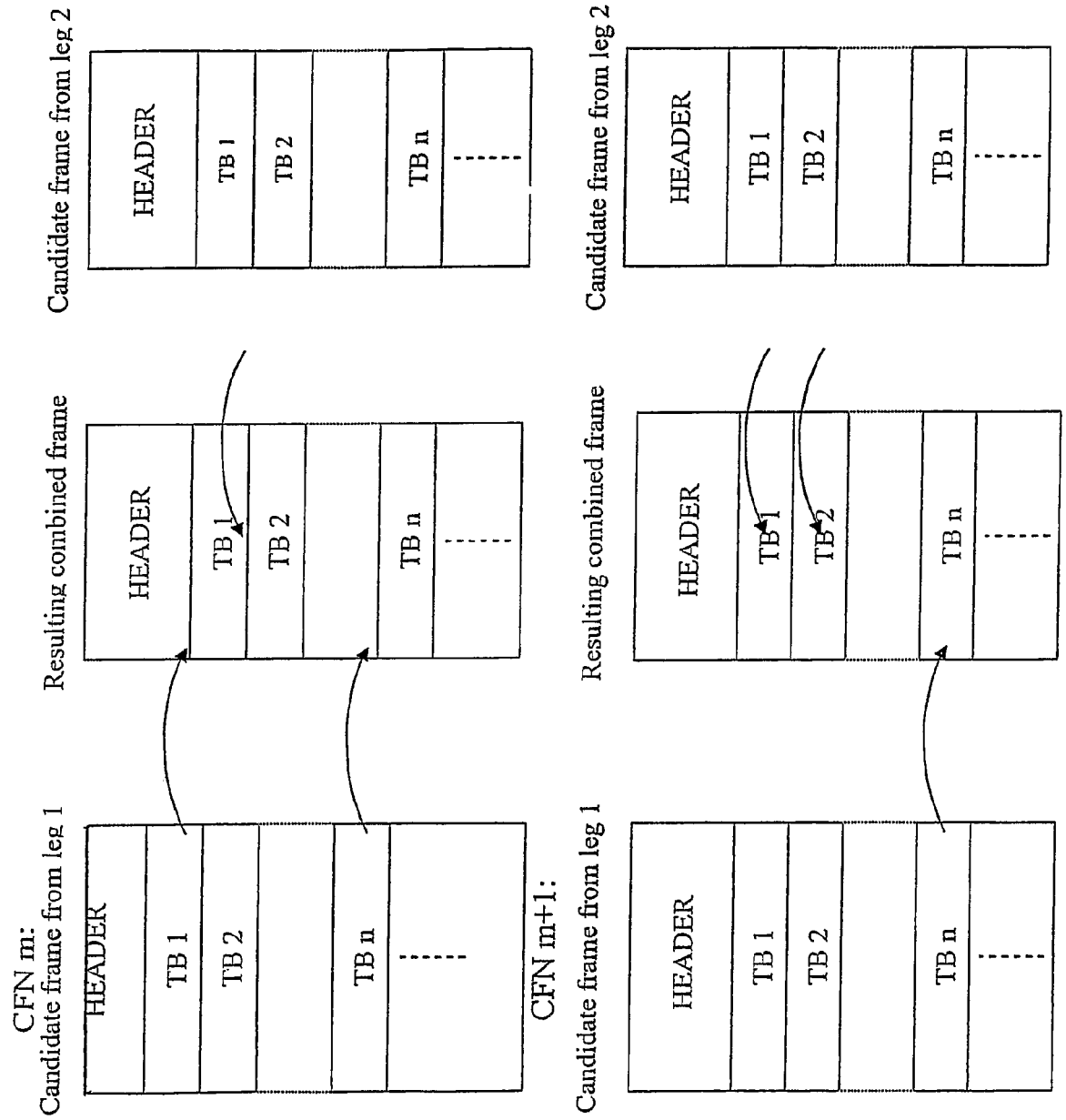
FIG. 2 illustrates the combining procedure for non-voice DCHs.
Figure 3:
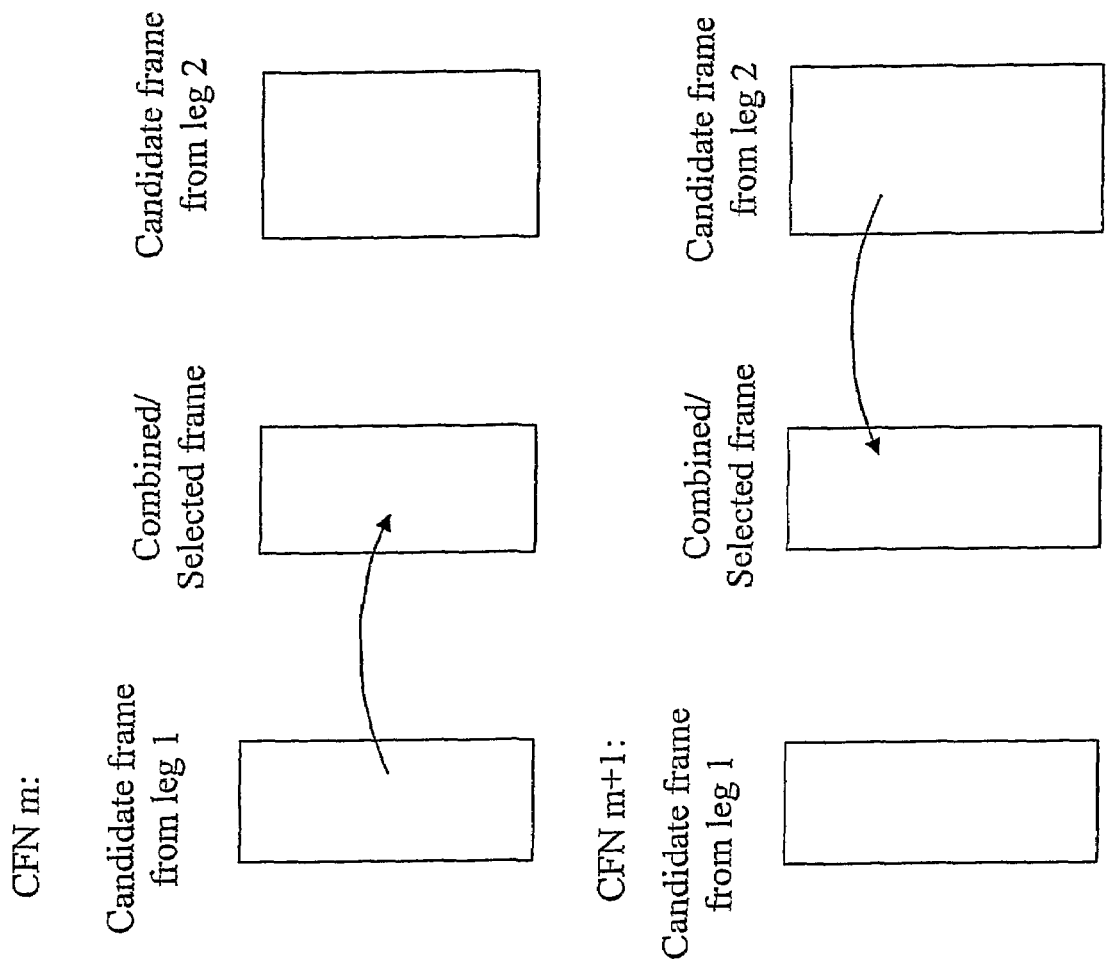
FIG. 3 illustrates the combining procedure for voice DCHs.

The present invention will now be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

In the further description coordinated DCHs are not specifically treated. In the aspects that are significant a set of coordinated DCHs is treated in the same way as a single separate DCH. The DCHs of a set of coordinated DCHs use a common transport bearer and in an IP UTRAN the frames (of a set of coordinated DCHs) with the same CFN are included in the same User Datagram Protocol (UDP) packet. The special combining procedure for coordinated DCHs has been described above. Thus, omitting coordinated DCHs serves to simplify the description and makes the text more readable.

The embodiment(s) may be implemented in a third generation mobile telecommunications system, e.g. in a UMTS, and in particular in the Radio Access Network (RAN), e.g. a UMTS Terrestrial Radio Access Network, UTRAN. Such a system is illustrated in FIG. 1 and described above in conjunction with FIG. 1.

Figure 4:
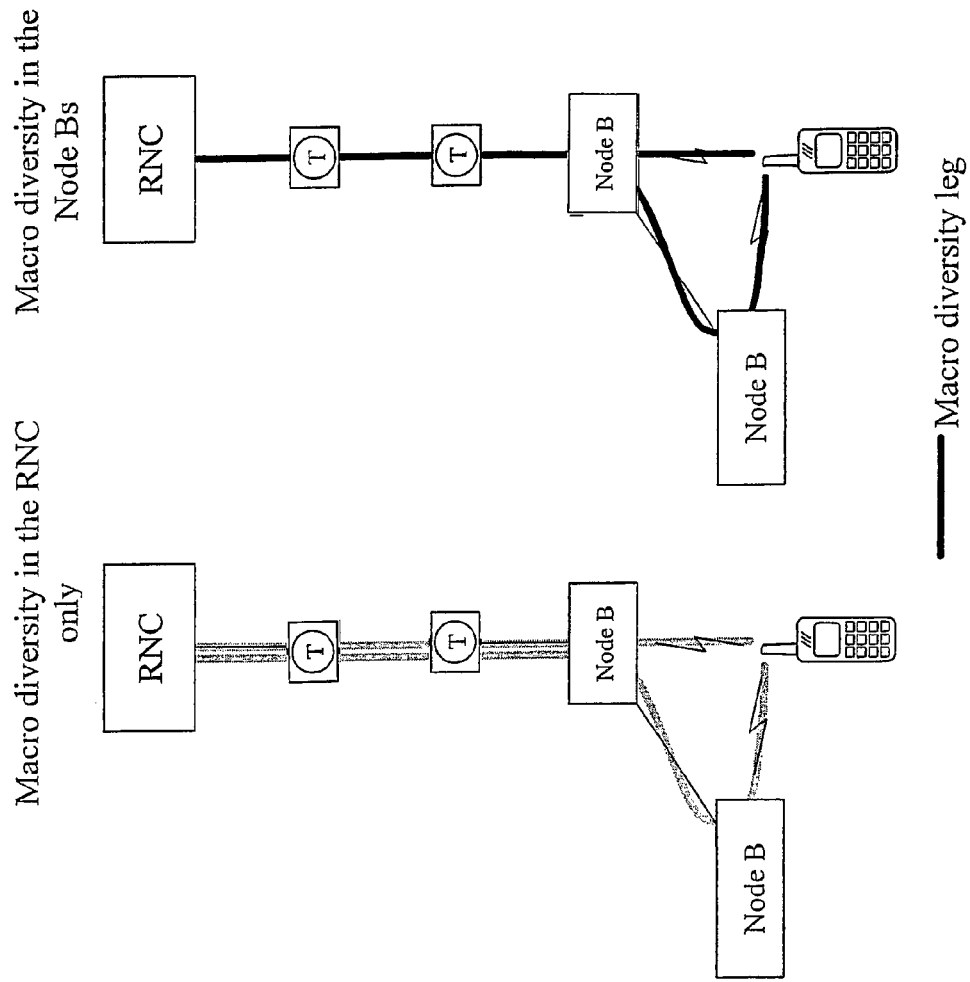
FIG. 4 illustrates the potential transmission savings in an example with cascaded Node Bs.

In order to reduce the required transmission resources, it is proposed to distribute the macro diversity functionality from the RNC to other nodes for macro diversity configurations for which this is beneficial from a transmission point of view. These other nodes are typically Node Bs, but may also be other types of nodes, e.g. specialized Diversity Handover nodes. The potential transmission savings when the macro diversity is distributed to Node Bs are illustrated in FIG. 4. When a macro diversity configuration is established, or changed, the Node Bs that should be the Diversity Handover (DHO) nodes are first selected, i.e. the Node Bs that should perform the actual combining and splitting, before the macro diversity function is executed. The DHO nodes should be selected out of the available nodes that include DHO functionality, i.e. out of the DHO enabled nodes (typically DHO enabled Node Bs). In the examples below, the Node Bs and the RNC are used as DHO nodes, but it should be noted that other nodes such as specialized DHO nodes or logically or geographically distributed RNCs or future types of nodes implementing parts of the RNC functionality also may be used as DHO nodes. In order to select the DHO nodes, the first step that is performed is to obtain topology information of the UTRAN transport network and how the nodes within the transport network are connected to the Node Bs. The topology information may for example be obtained in the topology map illustrated in FIG. 5.

The topology information can be obtained by developing a topology database. The topology database is adapted to provide the RNC with the information the RNC needs in order to determine when distribution of the DHO functionality to the Node Bs is beneficial and to select the Node Bs to be involved. The topology database is first described for an Internet Protocol (IP) based UTRAN, including its general properties and ways to create it. Then, in a further section, the topology database for an ATM based UTRAN is described.

The selection of the DHO node(s) implies that the RNC comprises or is adapted to retrieve information about the topology of the UTRAN, both the UTRAN transport network and the Node Bs and RNCs. Different levels of richness of this information are conceivable. The choice of this level is a trade-off between the value it provides for the DHO node selection mechanism and the complexity it implies for the selection mechanism as well as the topology information retrieval mechanism. A certain level of flexibility of the richness of the topology information will be allowed in the further description of the DHO node selection.

However, the topology information with a basic level of richness should include:

A hop-by-hop route from the RNC to each Node B that is controlled by the RNC and possibly some Node Bs that are controlled by neighboring RNCs, wherein each router is represented by the IP address associated with the interface that is used to forward packets in the direction of the RNC. The Node B is represented by one of its IP addresses, e.g. the one used for NBAP (Node B Application Part) signaling (or the primary IP address used for NBAP signaling in case multiple IP addresses are used for NBAP signaling). If a neighboring RNC is included in a hop-by-hop route, it is also represented by one of its IP addresses, e.g. the one used for RNSAP (Radio Network Subsystem Application Part) signaling (or the primary IP address used for RNSAP signaling in case multiple IP addresses are used for RNSAP signaling).

A delay metric for each hop in a route. If no explicit delay metric is available, an approximation can be derived from the generic cost metric, which is described below, or all hops can be given the same delay metric.

A generic cost metric for each hop in a route. The generic cost metric for a hop can be based on arbitrary properties of the link that the hop consists of, e.g. the link's capacity in terms of bit rate, its delay, the cost to rent the link (when applicable), etc. It is a generic parameter that represents the operator's relative willingness to use the link for data transport (high generic cost represents relatively low willingness and vice versa). If no such generic cost metric is explicitly available, a reasonable approximation can be derived from the delay metric or a fixed default cost metric can be used for all hops.

Preferably, the RNC is adapted to use the topology information to maintain data representations of the hop-by-hop routes with associated metrics to all the Node Bs in the Radio Network Subsystem (RNS) (and possibly to some Node Bs controlled by neighboring RNCs, i.e. Node Bs in neighboring RNSs). The RNS comprises the RNC and the Node Bs that are controlled by the RNC. Then the routes are readily available when needed for a DHO node selection process. However, retrieving topology information and creating the hop-by-hop routes in real-time when needed is also a possibility if the RNC maintains a generic topology database. For instance if the Transport Network Layer (TNL) in the RNC maintains a link state routing topology database, it is conceivable that this database is consulted (e.g. by letting the Radio Network Layer (RNL) of the RNC interrogate the TNL of the RNC) in order to create the required hop-by-hop route representations in real-time. From a performance perspective it is preferable that the hop-by-hop routes are readily available when they are needed.

In addition to the topology information the RNC should be manually or automatically configured with knowledge about the relevant Node Bs that are able to comprise DHO functionality, also referred to as DHO enabled nodes. The DHO enabled nodes are at least constituted by the DHO enabled nodes controlled by the RNC, but in inter-RNS macro diversity configurations they may also include other RNCs and Node Bs controlled by other RNCs. It is also possible that the DHO enabled nodes may include other, yet non-existing, types of Radio Network Layer (RNL) nodes, e.g. specialized DHO nodes. The RNC should know one IP address of each DHO enabled node, preferably the IP address used for NBAP signaling (or RNSAP signaling in the case of an RNC). This IP address should be the same IP address as is used to represent the node in a hop-by-hop route. The RNC may be adapted to use the list of DHO enabled nodes to include an indication of whether the node is DHO enabled or not for each node in the hop-by-hop routes.

There can be four possible ways for an RNC to provision the required topology information:

1. Through manual or semi-automatic management operations. When the UTRAN (including its transport network) is built or changed, the relevant topology information is configured in the RNC via O&M means.

2. Via a link state routing protocol. If a link state routing protocol, e.g. Open Shortest Path First (OSPF), is used in the UTRAN transport network, the RNC may be adapted to participate in the routing protocol communication as if it were a router. However, assuming that the RING does not have a router function (i.e. the IP forwarding function) it would not announce reachability to any network other than the site infrastructure LAN. Therefore, in practice, no node is likely to attempt to use the RNC as a transit node, a node that forwards traffic, i.e. a node that is neither the source node nor the destination node. Thus, through the routing protocol the RNC can include means for maintaining an up-to-date topology database, without being required to perform other router functions.

3. By using a traceroute mechanism that allows the RNC to discover the hop-by-hop route to each Node B. The traceroute mechanism is described in detail below.

4. By retrieving topology information from another RNC. However, this method is more applicable in the inter-RNs case.

The third of the above listed ways to provision topology information, i.e. the traceroute mechanism, is further described. Since the destination nodes, i.e. the Node Bs, are not arbitrary nodes in the network, they may be prepared for the traceroute messages. This allows the traceroute program to work slightly differently from traditional traceroute programs (although a traditional traceroute program would work too). A future IP based UTRAN will presumably use IPv6, but for completeness an RNC traceroute program variant for IPv4 is also described.

The RNC traceroute program for IPv6 uses a dedicated UDP port, the same source and destination port in both the RNC and the Node Bs. To begin the process, the traceroute program sends a UDP message with the UDP source and destination ports set to the dedicated port and with the destination address in the IP header set to the IP address used for NBAP signaling with the target Node B. The traceroute program also sets the hop limit field in the IP header to one and includes the time of sending as accurately as possible and a copy of the hop limit field in the UDP payload. The fact that the hop limit of the IP packet is set to one causes the first router in the path to discard the message and return a Time Exceeded ICMPv6 Message to the RNC. The Time Exceeded Message includes up to 1232 octets of the invoking message. Since this is far greater than the message sent by the RNC, the entire invoking message will be included.

When receiving the Time Exceeded Message the RNC is looking at the source address and the included message. In the included message the IP destination address informs the RNC which Node B route the message concerns, the hop limit field copy in the included UDP payload informs the RNC of the number of hops to the router that generated the Time Exceeded Message, and the recorded time of sending in the included UDP payload allows the RNC to calculate the round trip time from the RNC to the router and back. The source address in the IP header (of the Time Exceeded Message) provides an IP address of one of the routers (in this case the first router since the hop limit was set to one) to the RNC in the route towards the target Node B.

Next the RNC sends a second message, which differs from the first one in that the hop limit is increased to two (and that the time of sending is different). The RNC keeps sending messages with increasing hop limits until one of the messages reaches the target Node B. When the target Node B receives the message it extracts the hop limit copy and the time of sending from the received message and includes them in the payload of a new UDP message that is sent to the RNC (using the same dedicated port as source and destination port in the UDP header). The Node B may also be adapted to include additional information in the UDP payload, such as information about the link to which the Node B is connected e.g. bit rate, delay information, whether the Node B has an integrated router or not, etc.. Another useful piece of information that the Node B could include in the UDP payload is an indication of the level of support for the hierarchical DHO scheme. Three possible support levels may be indicated: DHO enabled, not DHO enabled but aware of the hierarchical DHO scheme, or no support at all (which would be the default when no indication at all is included in the UDP payload when such an indication is expected). Such an indication would provide the RNC with automatic configuration of the DHO capabilities of the Node Bs controlled by the RNC.

When the RNC receives the response message from the Node B it knows that one of its messages has reached the target Node B and that it can stop sending messages towards that Node B. The source address of the message informs the RNC which Node B it concerns. The hop limit copy in the UDP payload informs the RNC of the number of hops to the target Node B and the copied original time of sending in the UDP payload allows the RNC to calculate the round trip time to the Node B and back.

If it is not possible to conceive useful additional information to include in the response message from the Node B, the traceroute program may be modified. Then no program has to run in the Node B and when there is no process monitoring the dedicated port, the Node B will return a Destination Unreachable ICMPv6 Message (with the Code set to 'port unreachable'). In a similar way as the Time Exceeded Message, this message comprises the entire invoking message. The reception of the Destination Unreachable Message (instead of a Time Exceeded Message) informs the RNC that one of its messages has reached the target Node B. Then the required information, i.e. the source address, the hop limit copy and the original time of sending, may be extracted from the message.

Each roundtrip, i.e. a traceroute message and the triggered response message, reveals an additional hop in the route towards the destination Node B in terms of an IP address (i.e. the IP address that is used to send the IP packets towards the RNC) and a delay measure. Thus the RNC may use information revealed by a complete set of traceroute messages (and their triggered response messages) to build a complete hop-by-hop route from the RNC to a Node B with a delay metric associated with each hop. The generic cost metric for each hop is either equal to the delay metric for the hop or equal to a fixed value that is the same for each hop.

When IPv4 is used the Time Exceeded ICMPv4 Message and the Destination Unreachable ICMPv4 Message do not have to comprise more than 28 octets of the invoking packet. That is, there may be room only for the IP header and the UDP header of the message from the RNC, which means that there is no point to include information in the UDP payload (unless the information is intended for the target Node B). The RNC trace route program then has to work as traditional traceroute programs. That is, for each of its sequentially sent messages, it increases the destination UDP port number by one. The RNC is also required to store the destination address, the destination port, the hop limit and the time of sending for each message that it sends.

When a Time Exceeded Message is received, the RNC can use the destination address and the destination port in the included UDP header as keys to find the hop limit and the time of sending of the invoking messages. The RNC then has all the required information, i.e. the source address (of the Time Exceeded Message), the original hop limit and the original time of sending. Thus, like in the IPv6 case, the RNC can use the information revealed by a complete set of traceroute messages (and their associated response messages) to build a hop-by-hop route from the RNC to a Node B with a delay metric associated with each hop. The generic cost metric for each hop is either equal to the delay metric for the hop or a fixed value that is the same for each hop.

Normally IPv4 traceroute programs use UDP ports that are unlikely to be used by application programs. Thus, the destination node would almost certainly return a Destination Unreachable ICMPv4 message. However, there is a small risk that an application program is actually using the port in the destination node, in which case the traceroute program will fail. To avoid this risk the RNC traceroute program in the IPv4 case can use a set of ports that are dedicated for this purpose in the Node B. The number of dedicated ports must be at least as many as the maximum number of hops between an RNC and a Node B. Like in the IPv6 case it is possible to let the Node B include additional useful information in its response message to the traceroute message (which response message would then be a UDP message). In such case, the program generating the response message in the Node B must monitor all the dedicated ports. Otherwise, if no additional useful information is to be included in the response messages, the Node B can leave the dedicated ports unmonitored, in which case a received traceroute message will trigger a Destination Unreachable ICMPv4 message (just like when traditional traceroute programs are used).

To improve the stability of the traceroute delay measurements, the traceroute messages could be sent on high priority bearers, but the response messages from the Node B is preferred to be sent on the same type of bearer as the ICMP messages in order to provide a delay measurement (for the last hop) that can be compared with the delay measurements for the other hops. However, whether high priority bearers are used or not several traceroute measurements can be averaged in order to provide high quality delay measurements. The RNC could calculate the averages by repeating complete sets of traceroute messages or by repeating each traceroute message in a set.

Running a number (e.g. 3-5) of traceroute measurements (i.e. sets of traceroute messages) towards each base station in the RNS periodically such as every 24 hours would enable the RNC to maintain a reasonably up-to-date topology database with reasonably accurate link delay metrics, while incurring an insignificant load in the transport network. The traceroute measurements is preferred to be spread out during a period of low traffic load, e.g. during night-time.

In the case when the UTRAN transport network is ATM based, the topology database is based on ATM addresses instead of IP addresses. Otherwise the general properties of the topology database are similar to the properties of the database in the IP based UTRAN. Each hop in a hop-by-hop route is represented by an ATM address. For each hop there is an explicitly defined or implicitly derived generic cost metric and an explicitly defined or implicitly derived delay metric. In the ATM based UTRAN, the topology database has to be created through manual or semi-automatic management operations. The RNC uses the topology database in the same way in the ATM based UTRAN as in the IP based UTRAN.

Special considerations are needed when the required topology information is to be retrieved for an inter-RNS (inter Radio Network Subsystem) soft handover configuration, i.e. when one or more of the involved Node Bs are controlled by other RNC(s) than the S-RNC (and thus are located in other RNSs). It is assumed that the D-RNC is not necessarily involved in the user plane connections, just like common practice is today. Hence, the S-RNC is the appropriate node for selection of the DHO nodes also in the inter-RNS case. A question is then how the required topology information can be provisioned in the S-RNC in the inter-RNS case.

Configuration through manual or semi-automatic operations is a possibility also in the inter-RNS case. An RNC would then be configured not only with the topology information of its own RNS, but also with topology information pertaining to neighboring RNSs, through which potential inter-RNS soft handover connections may be anticipated. However, the more neighbouring RNSs to consider in this configuration, the more cumbersome the configuration gets.

A possible way to get around this scaling problem is to configure each RNC only with the topology information of its own RNS and then retrieve topology information from neighboring RNCs when needed. If this principle is used and topology information from a neighboring RNS is needed for selection of DHO nodes for an inter-RNS soft handover connection, then the S-RNC requests the relevant topology information from the D-RNC. This signaling may consist of e.g. a new pair of messages in RNSAP (e.g. called Topology Information Request and Topology Information Response). A tricky part in this scenario is to ensure that the combined topology information covers also the parts of the transport network that interconnect the two RNSs. This may require that all RNCs are configured with topology information covering the parts of the transport network that is used to interconnect RNSs. Like in the intra-RNS case manual or semi-automatic configuration is the only available means in an ATM UTRAN.

Using the inherent topology information collection mechanisms of a link state routing protocol in an IP UTRAN is a possibility also in the inter-RNS case. Depending on how the routers in the transport network are configured, a link state routing protocol entity in the RNC could maintain a topology database covering several RNSs, maybe even all the RNSs in the UTRAN. If the required topology of a neighboring RNS is not known to an RNC, the RNC may request it from the concerned RNC as described above for manually or semi-automatically configured topology information.

Theoretically the traceroute mechanism is possible to use in an IP UTRAN in the inter-RNS case too. However, this requires that an RNC includes not only the Node Bs of its own RNS in the traceroute scheme, but also all RNS external Node Bs (i.e. Node Bs in other RNSs) that potentially could be involved in an inter-RNS soft handover connection. Therefore the traceroute method may be hard to realize in the inter-RNS case. One way would be to configure the RNC with all the RNS external Node Bs to include in the traceroute scheme through manual or semi-automatic O&M means. Another possibility would be to utilize the cell neighbor lists and include in the traceroute scheme all RNS external Node Bs that are included in the cell neighbor lists of the cells in the RNS of the RNC itself. Yet a possibility would be to use the traceroute mechanism for the Node Bs in the RNS of the RNC itself and retrieve topology information from other RNCs via signaling (as described above) when needed.

If a neighboring RNC is included in the topology information, it should be represented by an IP address or an ATM address. In an IP UTRAN the IP address may e.g. be the IP address used for RNSAP signaling (or the primary IP address used for RNSAP signaling in case multiple IP addresses are used for this purpose).

Once the required topology information for neighboring RNS(s) is available (irrespective of what provisioning method that was used), the S-RNC uses it in the same way as in the intra-RNS case.

The DHO Node Selection Algorithm

It should be noted that, although the procedures of the DHO node selection algorithm are described below using the terminology of an IP UTRAN, they are equally applicable in an ATM UTRAN. In an ATM UTRAN the algorithms and procedures are the same, but where the routers are replaced by AAL2 switches and the IP addresses are replaced by ATM addresses.

The mechanism that the RNC is adapted to use in order to select the DHO node(s), i.e. the node(s) where the splitting and combining will be performed, is(are) the same whether optimized NBAP and RNSAP signaling is used or not. An object of the DHO node selection mechanism is to select the DHO nodes in a way that minimizes one or more accumulated metric for the all the macro diversity legs. According to one embodiment of the present invention, such an accumulated metric is a generic cost metric. According to a further embodiment this cost metric is put together with the condition that for none of the resulting data paths is the resulting path delay allowed to exceed a maximum delay value defined for the UTRAN.

In the typical scenario, a DCH is first established with a single leg, i.e. without macro diversity. When a second macro diversity leg is added, the RNC selects a DHO node for these two legs and redirects the existing data flow if necessary (i.e. unless the selected DHO node is the Node B of the first leg or the RNC itself When a third leg is added, the RNC can rerun the DHO node selection process from scratch, since the addition of the third leg may affect the selection of the first DHO node. The RNC also has the choice to let the third leg go all the way to the RNC (without trying to find a better DHO node) in order to not to affect the previous DHO node choice and to avoid the signaling involved in redirecting the existing flows. The same (i.e. rerunning the DHO node selection process from scratch or terminating the new leg in the RNC) applies to subsequently added macro diversity legs.

The DHO node selection mechanism relies on the above described topology information involving both transport networks nodes (routers) and radio network nodes (Node Bs and one or possibly more RNCs). It also utilizes the list of DHO enabled nodes connected to the RNC (and possible some DHO enabled nodes in neighboring RNSs The RNC selects a first set of preliminary DHO nodes in a way that minimizes the total accumulated generic cost metrics for the entire macro diversity tree. It then checks whether the maximum allowed path delay is exceeded for any of the macro diversity legs according to one embodiment. If the path delay is acceptable, the set of preliminary DHO nodes is kept. Otherwise the set of preliminary DHO nodes is modified by the RNC in a way that reduces the path delays until the path delays of all macro diversity legs are acceptable.

Selection of the First Set of Preliminary DHO Nodes

Figure 7:
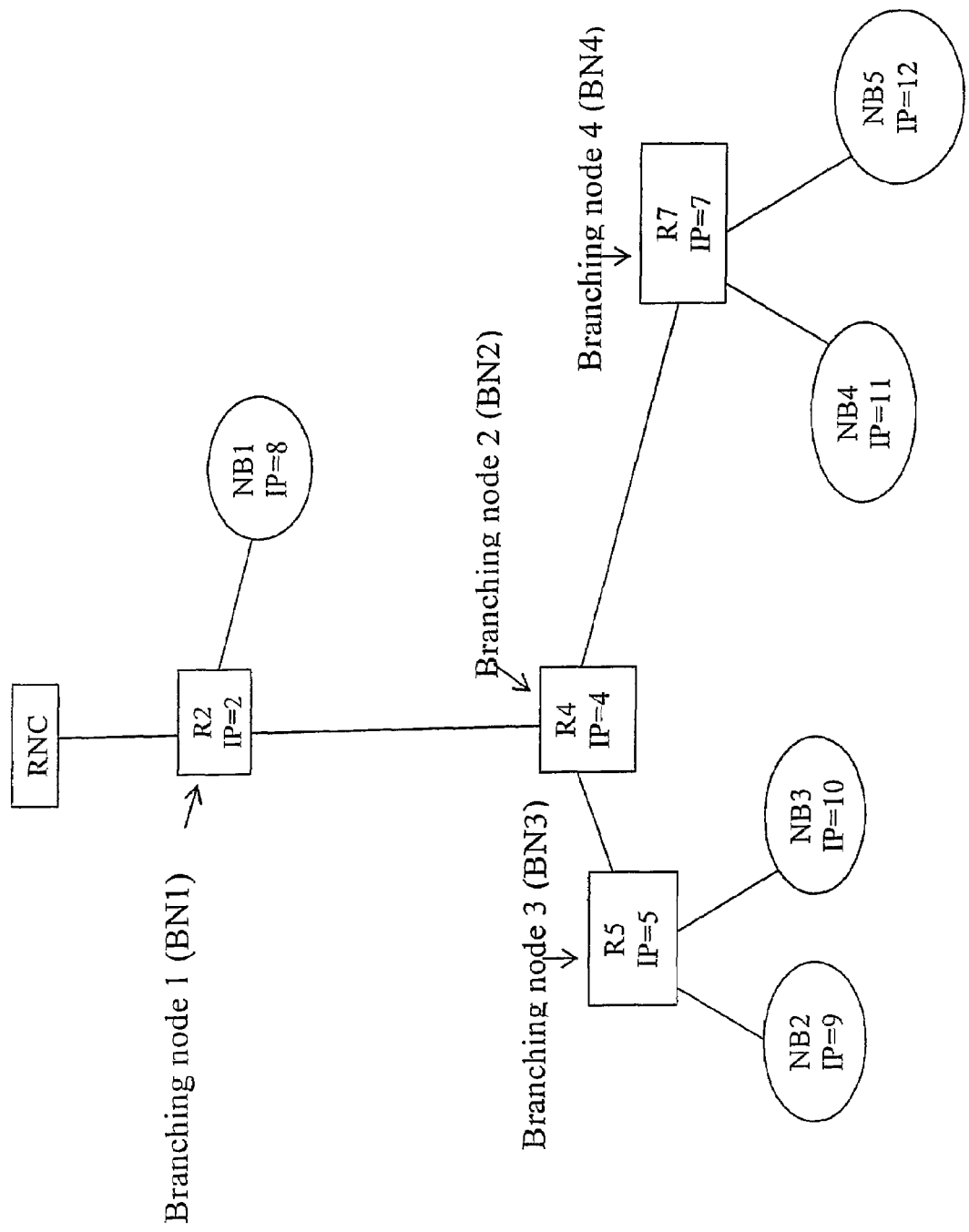
FIG. 7 shows the branching node tree corresponding to the route tree in FIG. 6.

In short the RNC starts the DHO node selection process by forming a tree of the routes (retrieved from the topology database) to the involved Node Bs. It then identifies the branching nodes in the tree and their relative interconnections. Identifying the relative interconnections of the branching nodes in essence means that the RNC creates a simplified schematic tree consisting of only branching nodes, Node Bs and the RNC (i.e. intermediate routers are omitted). The simplified schematic tree is illustrated in FIG. 7. For each branching node there is a corresponding potential DHO node and the RNC is arranged to proceed to select these DHO nodes. A detailed description of the complete process follows below.

Figure 5:
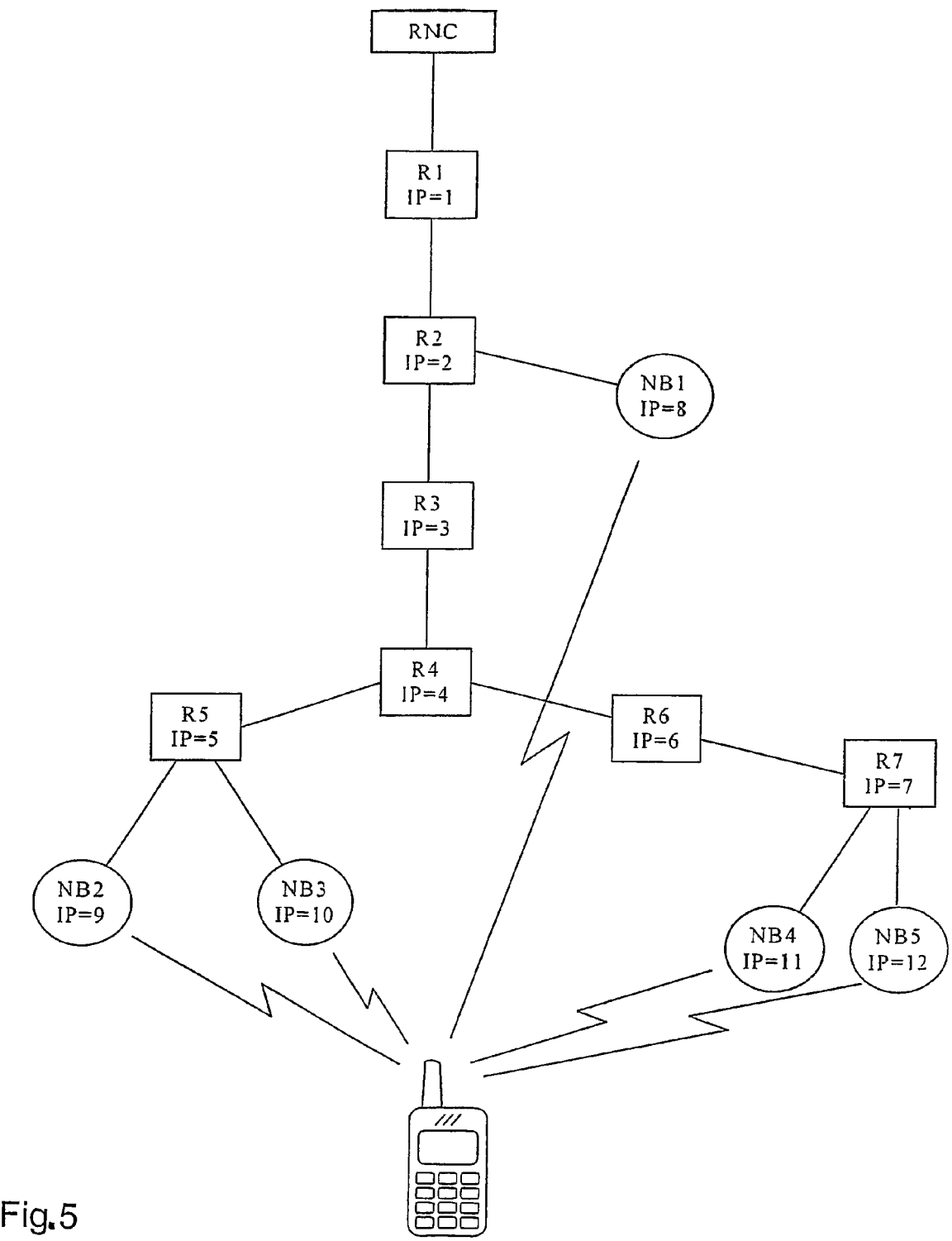
FIG. 5 illustrates a scenario with a mobile terminal using five macro diversity legs.

An example of the DHO node selection process based on a scenario depicted in FIG. 5 will be used throughout the description. The provided example is however only included to further facilitate the understanding of the present invention and not in order limit the present invention. FIG. 5 illustrates a DCH in soft handover mode with five macro diversity legs. The purpose of the illustrated example is to illustrate the principles of the DHO node selection process. R1-R7 in the FIG. 5 are routers and NB1-NB5 are Node Bs. IP=X means that the IP address of the node is X.

In a general case, the RNC has n (where n>1) connected Node Bs that are involved in the same DCH in soft handover mode. To select the DHO nodes for the DCH the RNC is adapted to retrieve from its above described topology database the full hop-by-hop routes between the RNC and each of the involved Node Bs. The retrieved routes form a "route tree". Nodes where two or more routes join are called branching nodes (BNs). The RNC comprises means for selecting the best DHO node(s) based on the nodes of the route tree. To only search for DHO nodes in the route tree is a restriction, which means that potential off-tree DHO nodes, which could be more optimal than on-tree DHO nodes, are disregarded. This restriction is a trade-off to limit the complexity of the selection mechanism. If the best of all potential DHO nodes (on-tree as well as off-tree nodes) were to be sought and an optimal route tree (independent of the individual routes) were to be created, this would involve calculation of Steiner trees, which is very complex and computation demanding. Thus, although not optimal, selecting the DHO node(s) from the on-tree nodes is considered good enough for this application at least in its basic form.

Furthermore, when selecting the DHO node(s) the RNC is able to use either of two different basic approaches. The RNC is either adapted to choose among all the on-tree DHO enabled nodes in the route tree or only among the DHO enabled nodes that are aware of the radio link properties of the DCH that the macro diversity concerns. The former approach allows more DHO enabled nodes to choose from, which in turn may result in a more efficient macro diversity tree. However, when a DHO enabled node is selected that is not aware of the radio link properties of the DCH it is selected to combine, additional signaling is required to inform this DHO node of the DCH properties it needs to know in order to combine macro diversity legs of the DCH. In the latter approach the potential DHO nodes are restricted to RNCs and Node Bs that are responsible for at least one radio link towards the concerned UE. An S-RNC is inherently aware of the required DCH properties, a D-RNC is informed via RNSAP signaling and a Node B responsible for a radio link is informed via NBAP signaling. A Node B that is responsible for a radio link towards the UE (i.e. a Node B that is included in the active set) is henceforth referred to as a "cradio active Node B". A Node B that is not responsible for a radio link towards the UE (i.e. a Node B that is not included in the active set) is henceforth referred to as a "non-radio active Node B". Correspondingly, a DHO node that is responsible for a radio link towards the UE (i.e. a radio active Node B) is referred to as a "radio active DHO node". Other DHO nodes are referred to as "non-radio active DHO nodes".

In the further description of the DHO node selection algorithm it is assumed that the RNC selects the DHO node(s) among all the DHO enabled nodes in the route tree. However, the same algorithm may be used to select the DHO nodes among the RNCs and the DHO enabled radio active Node Bs in the route tree. That implies that only RNCs and DHO enabled radio active Node Bs are considered as potential DHO nodes instead of all RNCs and DHO enabled Node Bs in the route tree.

A retrieved hop-by-hop route is represented by a list of IP addresses (the IP addresses of the intermediate routers and the destination Node B), accompanied by a number of metrics for each hop. The IP address of the RNC can be omitted, since it is not needed for the DHO node selection process. The metrics may include one or both of a delay metric and a generic cost metric (based on arbitrary criteria). The metrics may be asymmetric, in which case one set of metrics is supplied for each direction of a link, or symmetric, in which case the same set of metrics is valid for both directions. In the illustrated example the metrics include both a symmetric delay metric and a symmetric generic cost metric according to one embodiment of the present invention. Table 1 shows the information that could be included in the route information that the RNC retrieves in the example scenario (i.e. the scenario depicted in FIG. 5).

TABLE 1

| Route from the RNC to the Node B (NB) 1 | | |
|---|---|---|
| 1 | 1 | 1 |
| 2 | 1 | 2 |
| 8 | 1 | 3 |
| IP addresses (excluding the RNC) | Symmetric generic cost metric for hop from preceding node | Symmetric delay metric for hop from preceding node |
| Route from the RNC to the NB2 | | |
| 1 | 1 | 1 |
| 2 | 1 | 2 |
| 3 | 2 | 3 |
| 4 | 2 | 3 |
| 5 | 3 | 4 |
| 9 | 5 | 5 |
| Route from the RNC to the NB3 | | |
| 1 | 1 | 1 |
| 2 | 1 | 2 |
| 3 | 2 | 3 |
| 4 | 2 | 3 |
| 5 | 3 | 4 |
| 10 | 4 | 5 |
| Route from the RNC to the NB4 | | |
| 1 | 1 | 1 |
| 2 | 1 | 2 |
| 3 | 2 | 3 |
| 4 | 2 | 3 |
| 6 | 2 | 3 |
| 7 | 3 | 4 |
| 11 | 4 | 5 |
| Route from the RNC to the NB 5 | | |
| 1 | 1 | 1 |
| 2 | 1 | 2 |
| 3 | 2 | 3 |
| 4 | 2 | 3 |
| 6 | 2 | 3 |
| 7 | 3 | 4 |
| 12 | 5 | 5 |

With reference to the example illustrated in FIG. 5, table 1 includes the routes with associated metrics received from the topology database. In this example symmetric delay and cost metrics are used.

Figure 6:
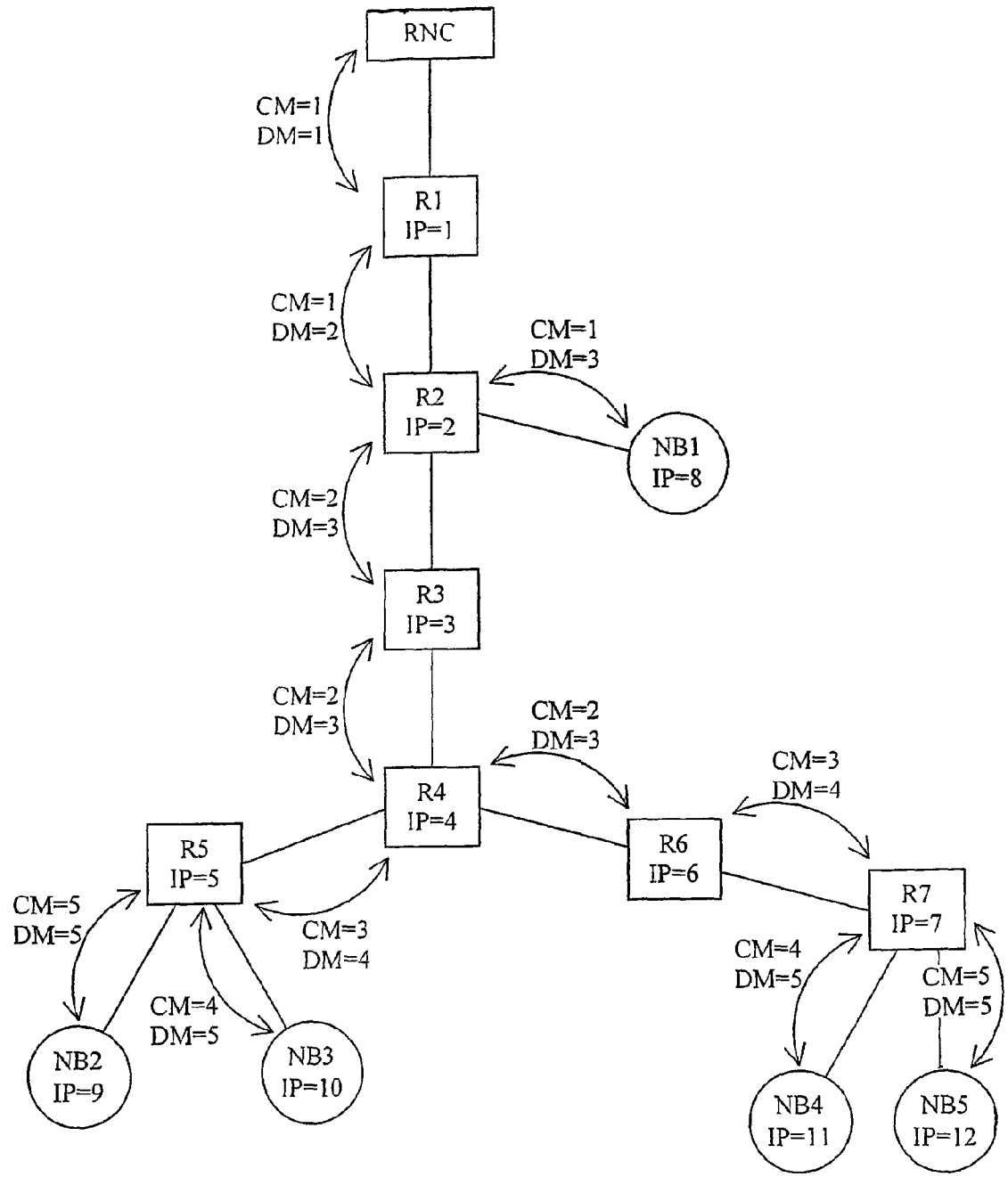
FIG. 6 shows a route tree resulting from the exemplified scenario of FIG. 5.

To form a tree of the retrieved routes the RNC is adapted to see the routes as branches and to identify the branching nodes (of which there may be 1 through n−1 where n is the number of branches). To identify the branching nodes, the RNC is arranged to start with the first IP address in the respective lists and then to step one address at a time to identify when a branch diverges, i.e. when its IP address differs from the IP address of the other branch(es). The IP address before a diverging IP address in the lists represents a branching node. If two branches have no IP address at all in common, then the RNC is the branching node for these two branches. The procedure continues until all branching nodes have been identified. FIG. 6 shows the route tree that results from the example scenario of FIG. 5.

When all the branching nodes have been identified, their relative interconnections, as well as their connections to Node Bs and the RNC, are identified. Identifying these connections in essence means that the RNC is adapted to create a simplified schematic tree consisting of only branching nodes, Node Bs and the RNC (i.e. intermediate routers are omitted). As is the case of the original route tree, this is still just a logical construction, essentially a data structure, in the RNC. It has yet no physical realization in the UTRAN. FIG. 7, illustrates a branching node tree corresponding to the route tree in FIG. 6 (i.e. the branching node tree resulting from the example scenario of FIG. 5) and table 2 shows how the branching node tree could be represented as a data table. It should be noted that BN X means branching node number X.

TABLE 2

| Branching node (BN) | IP address | Uplink connection | Downlink connections |
|---|---|---|---|
| BN1 | 2 | RNC | BN2, IP = 4 |
|  |  |  | NB1, IP = 8 |
| BN2 | 4 | BN1, IP = 2 | BN3, IP = 5 |
|  |  |  | BN4, IP = 7 |
| BN3 | 5 | BN2, IP = 4 | NB2, IP = 9 |
|  |  |  | NB3, IP = 10 |
| BN4 | 7 | BN2, IP = 4 | NB4, IP = 11 |
|  |  |  | NB5, IP = 12 |

An identified branching node may be an RNC, one of the Node Bs or an intermediate router. That is, it is not certain that a branching node is a DHO enabled node. However, for each branching node there is a corresponding potential DHO node. With a branching node as the starting point the RNC comprises means for selecting the best corresponding DHO node. To do this the RNC is arranged to make use of the cost metrics assigned to each hop and a list of the DHO enabled nodes in the RNS (represented by their IP addresses, i.e. the same IP addresses as are used to represent the nodes in hop-by-hop routes). In the inter-RNS case (i.e. when more than one RNS is involved) the RNC may also make use of lists of DHO enabled nodes in neighboring RNSs. In such case the RNC may be configured with these lists or it may retrieve them from the RNCs of the neighboring RNSs via signaling. In the DHO node selection example based on the example scenario of FIG. 5 the RNC and all the Node Bs in the route tree are assumed to be DHO enabled.

The algorithm used for selecting a DHO node corresponding to a certain branching node is simple. Starting from the branching node the RNC is able to accumulate the generic cost metric in each direction (i.e. in the direction of each branch in the original route tree including the uplink) from the branching node until a DHO enabled node (or the end of the path) is found. (If asymmetric generic cost metrics are used, the generic cost metrics should be the accumulated roundtrip from the branching node to the found DHO enable node and back. If symmetric cost metrics are used it suffices to accumulate the generic cost metrics in one direction.) The RNC does this by using the original route tree—not the simplified one. The DHO enabled node that was found with the smallest accumulated generic cost metric is selected as the DHO node corresponding to the concerned branching node. If the branching node is itself a DHO enabled node, it will of course be the selected DHO node, since it is obviously the best choice and the accumulated generic cost metric will be zero.

If more than one DHO enabled node is found with the same smallest accumulated generic cost metrics, the RNC should select the one that adds the least delay (in terms of accumulated delay metrics) to the original route from the concerned branching node to the RNC in accordance with an embodiment of the present invention. To calculate the added delay for a certain DHO enabled node the RNC comprises means for identifying the node in the original route (i.e. the route from the concerned branching node to the RNC in the route tree) that is the closest to the DHO enabled node. The added delay is then calculated as the accumulated hop-by-hop delay metrics roundtrip from the identified closest node in the original route to the concerned DHO enabled node and back. If the added delays also are equal, the RNC is arranged to arbitrarily choose between the concerned DHO nodes in accordance with an embodiment of the present invention.

According to a further embodiment of the present invention, an alternative and simpler way for the RNC to select a DHO node out of two or more DHO enabled nodes that are found with the same smallest accumulated generic cost metrics is to arbitrarily select one of them. The resulting DHO node selections will be less optimal, but the advantage is that the RNC avoids the above described calculations of the added delays that complicates the DHO node selection process.

Returning now to the DHO node selection example based on the example scenario in FIG. 5, the DHO nodes corresponding to the identified branching nodes will be selected as follows. Since symmetric generic cost metrics are used in this example, the cost metric is accumulated in only a single direction between a branching node and a potential DHO node. The DHO node corresponding to branching node R7 is NB4, for which the accumulated generic cost metrics from R7 is 4. All the other DHO enabled nodes in the route tree have greater accumulated generic cost metrics from this branching node. Similarly, the selected DHO node corresponding to the branching node R5 is NB3, for which the accumulated generic cost metrics from R5 is 4. The selected DHO node corresponding to the branching node R4 is NB3 again, for which the accumulated generic cost metrics from R5 is 7. The selected DHO node corresponding to the branching node R2 is NB1, for which the accumulated generic cost metrics from R2 is 1.

Figure 8:
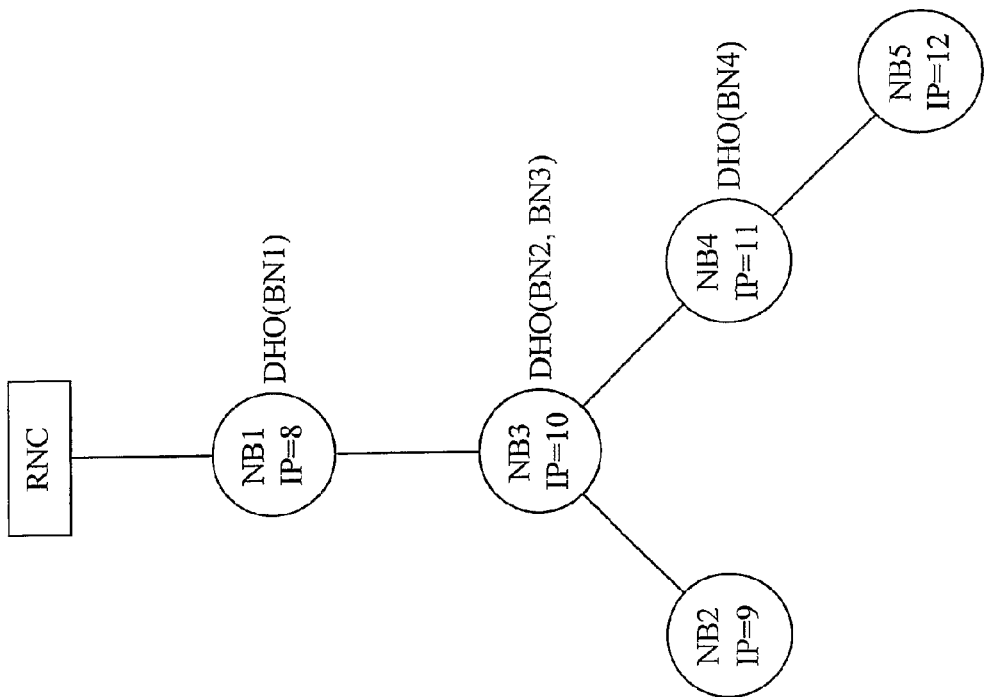
FIG. 8 shows the DHO node tree resulting from the selection of DHO nodes corresponding to the branching nodes of the example depicted in FIG. 5.

When the DHO node corresponding to each branching node has been selected, the selected DHO nodes are (logically) interconnected in the same way as their corresponding branching nodes (i.e. as indicated in the simplified schematic tree of branching nodes, Node Bs and the RNC) into a tree of DHO nodes, Node Bs (which are the leaf nodes of the tree) and the RNC. This tree is denoted "DHO node tree". Furthermore, a node that is a part of a DHO node tree is denoted "DHO tree node". A DHO tree node may be any node within a DHO node tree. That implies that a DHO tree node may be a DHO node as described above, an RNC without DHO functionality or a Node B without DHO functionality, e.g. a leaf Node B. A DHO node may coincide with a Node B, an RNC or another DHO node. In such case the logical connection between the coinciding nodes disappear in the DHO node tree. Like the route tree and the branching node tree, this DHO node tree is a logical construction in the RNC without physical realization in the UTRAN. Table 3 and table 4 illustrate how the branching node tree table of the DHO node selection example, i.e. the branching node tree table of table 2, may be translated into a DHO node tree table. It should be noted that DHO(BNX) represents the selected DHO node corresponding to the branching node X. FIG. 8 illustrates the resulting DHO node tree (as a part of the DHO node selection example based on the example scenario in FIG. 5).

TABLE 3

| DHO node | IP address | Uplink connection | Downlink connections |
|---|---|---|---|
| DHO(BN1) | 8 | RNC | DHO(BN2), IP = 10 NB1, IP = 8 |
| DHO(BN2) | 10 | DHO(BN1), IP = 8 | DHO(BN3), IP = 10 DHO(BN4), IP = 11 |
| DHO(BN3) | 10 | DHO(BN2), IP = 10 | NB2, IP = 9 NB3, IP = 10 |
| DHO(BN4) | 11 | DHO(BN2), IP = 10 | NB4, IP = 11 NB5, IP = 12 |

From table 3 it can be concluded that DHO(BN2) and DHO(BN3) are one and the same node, i.e. NB3.

TABLE 4

| DHO node | IP address (and node name) | Uplink connection | Downlink connections |
|---|---|---|---|
| DHO(BN1) | 8 (NB1) | RNC | DHO(BN2), IP = 10 (BN1 radio i/f) |
| DHO(BN2, BN3) | 10 (NB3) | DHO(BN1), IP = 8 | DHO(BN4), IP = 11 NB2, IP = 9 (NB3 radio i/f) |
| DHO(BN4) | 11 (NB4) | DHO(BN2, BN3), IP = 10 | NB5, IP = 12 (NB4 radio i/f) |

Table 4 is the final DHO node tree table derived from the branching node tree table of table 2 (which is a part of the DHO node selection example based on the example scenario in FIG. 5). DHO(BN2) and DHO(BN3) have now been merged into a single DHO node, DHO(BN2, BN3).

FIG. 8 shows the DHO node tree resulting from the selection of DHO nodes corresponding to the branching nodes of the DHO node selection example based on the example scenario in FIG. 5. A data representation of the DHO node tree can be found in table 4.

Checking that the Maximum Allowed Delay is Not Exceeded (Also Referred to As the Delay Reduction Phase)

Figure 9:
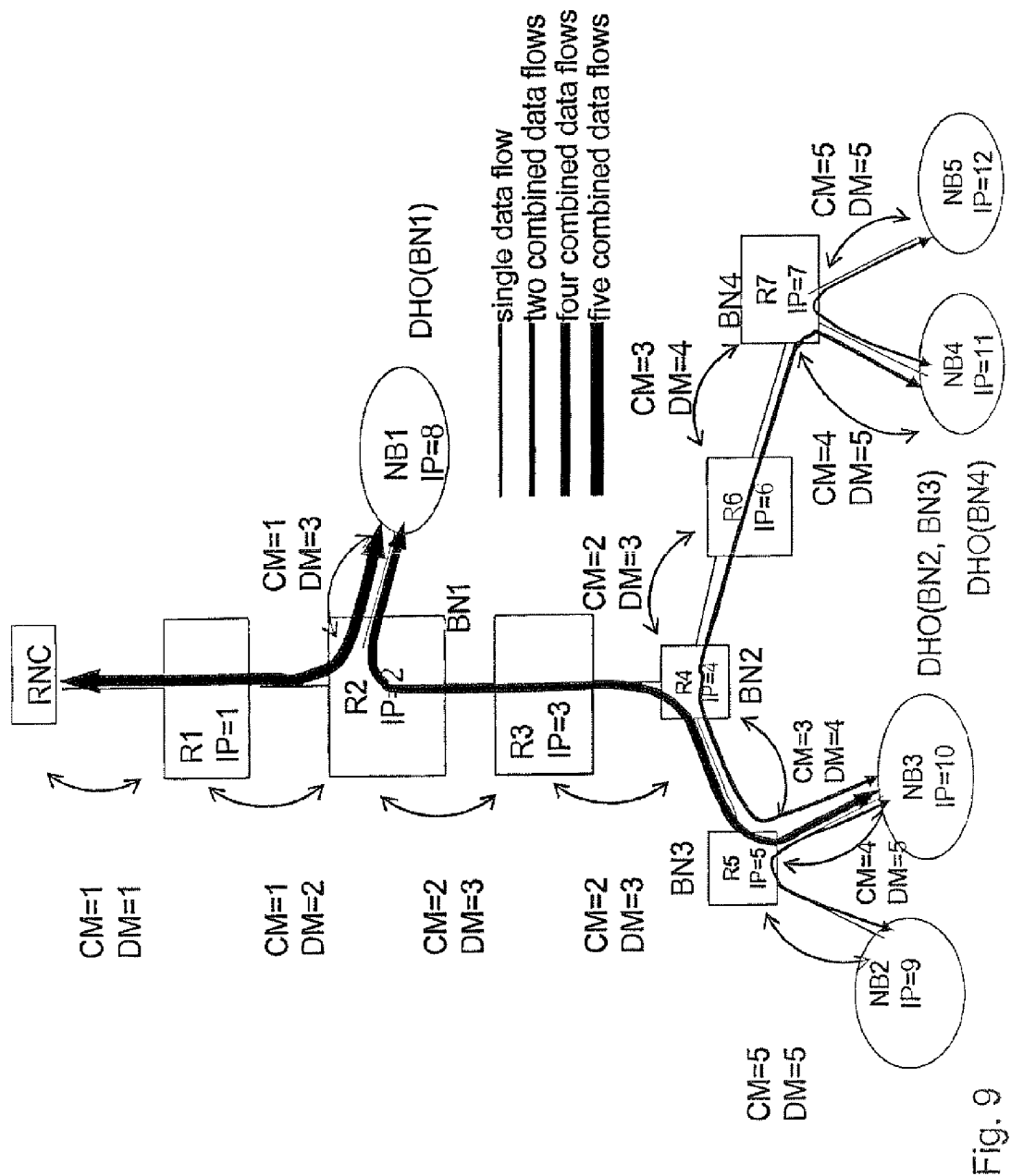
FIG. 9 shows the DHO node tree of FIG. 8 mapped on the route tree of FIG. 6 with the resulting potential data flows.

When the DHO nodes are selected, the last step before instructing the UTRAN nodes to establish the route tree including the selected DHO nodes is to check that the maximum allowed transport delay between a Node B and the RNC is not exceeded. To do this, the connections in the DHO node tree are mapped onto the original route tree to form complete hop-by-hop routes. FIG. 9 illustrates this for the DHO node selection example based on the example scenario in FIG. 5, i.e. the DHO node tree of FIG. 8 is mapped on the route tree of FIG. 6. The resulting data flows are shown with the thicker arrows in FIG. 9.

The RNC analyzes and adds the hop-by-hop delay, which is a part of the topology information for each Node B-RNC path, together to a complete transport delay for the new data path in both directions. For the uplink a default delay value for the frame combining procedure is also added by the RNC for each DHO node in the path except the first one.

The delay calculated from the topology database may not be accurate enough, but may still be used for relative delay measurements. Combining the relative delay measurements (using the delay metrics of the topology database) with the more accurate Node Synchronisation measurements the result should be accurate enough. The Node Synchronization measurements are further described in 3GPP TS 25.402 V5.1.0, "3$^{rd}$ Generation Partnership Project; Technical Specification Group Radio Access Network; Synchronisation in UTRAN Stage 2 (Release 5)" and in 3GPP TS 25.427 V5.0.0, "3$^{rd}$ Generation Partnership Project; Technical Specification Group Radio Access Network; UTRAN Iub/Iur interface user plane protocol for DCH data streams (Release 5)".

The Node Synchronisation procedure, which is a part of the DCH Frame Protocol (and other UTRAN user plane protocols), measures accurately the round trip delay from the RNC to a Node B and back. For increased stability and accuracy the Node Synchronisation procedure may optionally be carried over dedicated high priority bearers. The Node Synchronisation procedure may be executed at any time, but in principle it should only have to be executed when the topology of the transport network has changed. The Node Synchronisation procedure is performed between the RNC and one or more Node Bs. The RNC sends a downlink Node Synchronisation control frame to one or more Node Bs (if the control frame is sent in the user plane of a DCH in soft handover mode, the control frame is subject to splitting and will reach all the involved Node Bs). The downlink Node Synchronisation control frame contains certain time parameters. Each Node B that receives a downlink Node Synchronisation control frame responds with an uplink Node Synchronisation control frame containing certain time parameters. A reasonable alternative could be to execute the Node Synchronisation procedure every time a corresponding set of traceroute measurements has been carried out (when traceroute measurements are used). In the calculations combining the relative delay measurements (using the delay metrics of the topology database) with Node Synchronisation delay measurements the following notation is used:

| | |
|---|---|
| $D_{NS}$ | The delay measured with the Node Synchronisation procedure. |
| $D_{top\text{-}old\text{-}DL}$ | The downlink transport delay of the original path (i.e. the route retrieved from the topology database) calculated from the topology database. |
| $D_{top\text{-}old\text{-}UL}$ | The uplink transport delay of the original path calculated from the topology database. |
| $D_{top\text{-}new\text{-}DL}$ | The downlink delay of the new path calculated from the topology database. |
| $D_{top\text{-}new\text{-}UL}$ | The uplink delay of the new path calculated from the topology database. |
| $N_{DHO}$ | The number of DHO nodes in the data path (including the RNC if the RNC is one of the selected DHO nodes). |
| $D_{comb}$ | The default delay value for frame combining. This value may depend on the number of frames that are combined, but henceforth it is assumed that the parameter has a fixed value that is independent of the number of combined frames. |
| $D_{new\text{-}path\text{-}DL}$ | The estimated downlink delay of the new path as a result of combining the measurements based on the topology database and the Node Synchronisation measurements. |
| $D_{new\text{-}path\text{-}UL}$ | The estimated uplink delay of the new path as a result of combining the measurements based on the topology database and the Node Synchronisation measurements. |

By combining the different delay parameters reasonably accurate values of the downlink and uplink delays of the new path may be calculated as follows:

$$D_{top\text{-}old\text{-}DL} = \Sigma \text{downlink hop delays of old path}$$

$$D_{top\text{-}old\text{-}UL} = \Sigma(\text{uplink hop delays of old path})$$

$$D_{top\text{-}new\text{-}DL} = \Sigma(\text{downlink hop delays of new path})$$

$$D_{top\text{-}new\text{-}UL} = (N_{DHO}-1) \times D_{comb} + \Sigma(\text{uplink hop delays of new path})$$

$$\Rightarrow$$

$$D_{new\text{-}path\text{-}DL} = (D_{top\text{-}new\text{-}DL}/D_{top\text{-}old\text{-}DL}) \times D_{NS}$$

$$D_{new\text{-}path\text{-}UL} = (D_{top\text{-}new\text{-}UL}/D_{top\text{-}old\text{-}UL}) \times D_{NS}$$

If symmetric delay metrics are used the calculations are slightly simplified. The delay values that should be compared with the maximum allowed delay are the values of $D_{new\text{-}path\text{-}DL}$ and $D_{new\text{-}path\text{-}UL}$. This means that if the measurements based on the topology data are somewhat inaccurate, the maximum allowed value of the $D_{top\text{-}new\text{-}DL}$ and $D_{top\text{-}new\text{-}UL}$ parameters may be different for different data paths. For instance, a certain $D_{top\text{-}new\text{-}DL}$ for one data path may cause the $D_{new\text{-}path\text{-}DL}$ value to exceed the maximum allowed value, whereas the same $D_{top\text{-}new\text{-}DL}$ value for another data path may result in a $D_{new\text{-}path\text{-}DL}$ value within the allowed range.

If either $D_{new\text{-}path\text{-}DL}$ or $D_{new\text{-}path\text{-}UL}$ exceeds the maximum allowed delay in the transport network (or a slightly lower delay threshold to provide a safety margin), the concerned path should be changed. There are different ways to do this with different levels of complexity (and performance). Ideally the DHO node selection should be restarted with new conditions to arrive at a new result, possibly with entirely or partly new DHO nodes. The goal should be to achieve data paths with acceptable delays with as small increase as possible in the overall accumulated cost metrics compared to the first DHO node tree. However, another important goal is to keep the algorithm simple and computation efficient. Therefore the DHO node selection is preferably not restarted. Instead the concerned data path is modified in order to decrease its delay down to an acceptable level.

One way to modify the data path is to remove one or more DHO nodes from the path, until the path delay is smaller than the maximum allowed value. By removal of a DHO node from a path is meant that the concerned data flow bypasses the DHO node. The removed DHO node may remain in the path (if it is included in the original route of the Node B of the path), but its DHO functionality is not applied to the concerned data flow. If the data flow had to make a detour to reach the DHO node, the DHO node will not remain in the path after its removal.

Which DHO node(s) should be removed? According to embodiments of the present invention, there are several methods for stepwise removal of DHO nodes in a path. They differ in complexity and efficiency. In all but the last method (which is fundamentally different from the others) the required path delay reduction (calculated in the route tree using data from the topology database) may preferably be calculated before the path delay reduction method is started.

If the downlink path delay is too large, the required downlink delay reduction (in terms of delay metrics) is $D_{red\text{-}DL} = D_{top\text{-}new\text{-}DL} - D_{max} \times D_{top\text{-}old\text{-}DL}/D_{NS}$, where $D_{red\text{-}DL}$ is the required downlink delay reduction and Dmax is the maximum allowed delay. If the uplink path delay is too large, the required uplink delay reduction (in terms of delay metrics) is $D_{red\text{-}UL} = D_{top\text{-}new\text{-}UL} - D_{max} \times D_{top\text{-}old\text{-}UL}/D_{NS}$, where $D_{red\text{-}UL}$ is the required uplink delay reduction.

If more than one of the paths (i.e. macro diversity legs) have too large delays, the RNC should perform the delay reduction through DHO node removal for the path with the greatest delay first. The removal of DHO nodes from this path may reduce the delay of other paths too (e.g. if a DHO node was removed from a part of the path that represents a combined data flow). Thus, before starting the delay reduction for the next path the RNC should check whether the path delays have changed as a result of delay reduction measures for previous paths.

Below are a few path delay reduction methods based on DHO node removal with reasonable relation between efficiency and complexity. In case the RNC (i.e. the S-RNC) is a DHO node, it is excluded from the DHO nodes that can be removed. This applies to all the methods. The methods assume that there is at least one DHO node other than the RNC in the concerned path. This is a safe assumption, since a path with the RNC as the only DHO node (i.e. a path according to the current UTRAN macro diversity principles) could not have a too large delay, unless the transport network is erroneously designed or configured. Should such a case still arise, then the RNC should assume that the delay measurements are incorrect and use the path anyway. All the methods can be applied to the downlink and the uplink separately, but the methods are to the most part described independently of downlink and uplink.

When a DHO node is removed from the path, the path delay normally decreases and the cost in terms of accumulated generic cost metrics of the path normally increases. Regarding the delay, the delay reduction for a certain path is what matters. If a removed DHO node remains in the path (although it no longer applies its DHO functionality to the concerned data flow), the downlink path delay is unaffected, whereas the uplink path delay is reduced by a frame combining delay (unless the removed DHO node was the hierarchically highest DHO node in the path). In all other DHO node removal cases the path delay is reduced. Regarding the generic cost metrics, what matters is the increase in the total generic cost metrics for both directions of the concerned DCH (i.e. including both directions of all the macro diversity legs). In almost all DHO node removal cases the total generic cost metrics is increased, but in certain extreme and unlikely scenarios it may be unaffected or even decreased as a result of a DHO node removal. A cost metric decrease is represented as a negative cost metrics increase in the calculations.

In several of the delay reduction methods the RNC calculates the potential path delay reduction (in terms of delay metrics) and/or cost increase (in terms of the generic cost metrics for the whole DCH) that would result from the removal of a certain DHO node from the path.

To calculate the potential path delay reduction the RNC first identifies the node that is the closest to the concerned DHO node out of the nodes in the original route (i.e. the route retrieved from the topology database) of the RNC-Node B path (or Node B-RNC path) whose delay is to be reduced. This may be a branching node (in the original route tree), but it may also be the DHO node itself (which may or may not be a branching node). The potential downlink path delay reduction (in terms of delay metrics) is calculated as the accumulated hop-by-hop delay metrics in the roundtrip from the identified closest node (in the original route) to the DHO node and back to the identified closest node again. The potential uplink path delay reduction is calculated in the same way with the addition of a frame combining delay, unless the DHO node is the hierarchically highest DHO node in the path.

The calculation of the potential cost increase is more complicated. There are four different cases to consider:
1. Before its removal, the DHO node applied its splitting and combining functionality to three or more data flows which means that after the removal the DHO node will still apply its DHO functionality to at least two data flows.
2. Before its removal, the DHO node applied its splitting and combining functionality to two data flows which means that after the removal the DHO node will not apply its DHO functionality to any data flow. The DHO node is included in one and only one of the original routes i.e. the optimal routes in the route tree of the two concerned data flows.
3. Before its removal, the DHO node applied its splitting and combining functionality to two data flows which means that after the removal the DHO node will not apply its DHO functionality to any data flow. The DHO node is included in the original routes (i.e. the optimal routes in the route tree) of both the concerned data flows.
4. Before its removal, the DHO node applied its splitting and combining functionality to two data flows which means that after the removal the DHO node will not apply its DHO functionality to any data flow. The DHO node is not included in the original route (i.e. the optimal route in the route tree) of any of the concerned data flows.

In case 1, the RNC chooses the data flow from which the concerned DHO node potentially will be removed i.e. the data flow whose path delay is to be reduced. The RNC then identifies the node that is the closest to the concerned DHO node out of the nodes in the original route based on the route tree of the chosen data flow. The potential cost increase is then calculated as the accumulated hop-by-hop generic cost metrics roundtrip from the identified node to the next uplink DHO node in the path (or the RNC if there is no uplink DHO node) and back minus the accumulated hop-by-hop generic cost metrics roundtrip from the identified node to the concerned DHO node and back. These calculations could be performed when delay reduction is required or in advance during the DHO node selection process (during which the RNC anyway performs hop-by-hop accumulations from branching nodes to potential DHO nodes).

In the second case, the RNC chooses the data flow for which the concerned DHO node is not included in the original route (as seen in the route tree). The RNC then performs the same node identification and cost increase calculation as described for case 1.

In the third case, the RNC arbitrarily chooses one of the two data flows. The RNC then performs the same node identification and cost increase calculation as described for case 1. In this case the RNC could equally well skip the node identification and simply calculate the cost increase as the accumulated hop-by-hop generic cost metrics roundtrip from the concerned DHO node to the next uplink DHO node in the path (or the RNC if there is no uplink DHO node) and back.

In the fourth case, the RNC performs the node identification and cost increase calculation described for case 1 for both data flows. To arrive at the total cost increase (which in this case may be negative) the RNC then adds together the cost increases calculated for both data flows and subtracts the accumulated hop-by-hop generic cost metrics roundtrip from the concerned DHO node to the next uplink DHO node in the path, or the RNC if there is no uplink DHO node, and back.

Another way to calculate the potential delay reduction is to tentatively remove the concerned DHO node, recalculate the entire path delay and subtract it from the path delay calculated before the DHO node removal. The potential cost increase can be calculated in a similar way by accumulating the hop-by-hop generic cost metrics in both directions for the entire DCH (i.e. for all macro diversity legs) before and after the tentative DHO removal.

According to embodiments of the present invention, there are nine different delay reduction methods adapted to be implemented in the RNC:
1. In this method, the RNC first calculates the potential delay reduction and cost increase (as described above) for each DHO node that could be removed from the path. It then chooses to remove the DHO node for which the potential cost increase/delay reduction ratio is the smallest. If this is not enough to bring down the path delay to an acceptable level, the method is repeated for the modified path.

2. In this method, the RNC first calculates the potential delay reduction and cost increase (as described above) for each DHO node that could be removed from the path. It also calculates the total accumulated generic cost metrics for the DCH (i.e. for the whole route tree). The RNC then chooses to remove the DHO node for which the greatest value results from the calculation of (potential delay reduction)/(total path delay before DHO node removal)−α×(potential cost increase)/(cost for the whole DCH in both directions before DHO node removal), where α is a configured value, e.g. 2. If this is not enough to bring the down the path delay to an acceptable level, the method is repeated for the modified path.

3. In this method, the RNC first calculates the potential cost increase (as described above) for each DHO node that could be removed from the path. It then chooses to remove the DHO node for which the potential cost increase is the smallest. If this is not enough to bring the down the path delay to an acceptable level, the method is repeated for the modified path.

4. In this method, the RNC first calculates the potential delay reduction (as described above) for each DHO node that could be removed from the path. It then chooses to remove the DHO node for which the potential delay reduction is the greatest. If this is not enough to bring the down the path delay to an acceptable level, the method is repeated for the modified path.

5. In this method, the RNC removes the first DHO node in the path in the direction from the Node B to the RNC, excluding DHO nodes that are included in the original RNC-Node B route retrieved from the topology database. The resulting delay reduction is calculated and if it is not enough, the method is repeated for the modified path. If it is only the uplink path delay that needs reduction and there is no DHO node in the path that is not included in the original route, then a DHO node that is included in the original route (except the RNC) may be removed in order to reduce the uplink path delay by the frame combining delay.

6. In this method, the RNC first calculates the potential delay reduction (as described above) for each DHO node that could be removed from the path. It then chooses to remove the DHO node for which the potential delay reduction is the smallest, but still greater than (or equal to) the required delay reduction. If no DHO node fulfilling this criterion can be found, the RNC chooses to remove a DHO node according to any of the criteria in methods 1 through 5. If the DHO node removal is not enough to bring the down the path delay to an acceptable level, the method is repeated for the modified path.

7. In this method, the RNC tries to leverage the fact that a DHO node removal may decrease the delay of more than one path. Thus, it first checks whether there is one or more other paths (other than the concerned path, the path with the largest delay reduction requirement that is) that also have too large delays. If so, the RNC identifies the DHO nodes that are common for the concerned path and one or more of the other paths needing delay reduction (and which DHO node is not included in the any of the original routes for the concerned Node Bs). Among these DHO nodes the RNC chooses to remove one according to any of the criteria in methods 1 through 5. If no such common DHO node can be found, the RNC chooses to remove a DHO node according to any of the criteria in methods 1 through 5. Alternatively, the RNC can identify the DHO nodes that are common for the concerned path and that of the other paths that needs the largest delay reduction (but which DHO node is not included in any of the original routes for the concerned Node Bs) and remove one of them (according to any of the criteria in methods 1 through 5). If the concerned path does not have any such DHO node in common with that of the other paths that needs the largest delay reduction, the RNC repeats the procedure with that of the other paths that needs the second largest delay reduction, and so on. Again, if the concerned path has no DHO node in common with any of the other paths needing delay reduction, the RNC chooses to remove a DHO node according to any of the criteria in methods 1 through 5. If this is not enough to bring the down the path delay to an acceptable level, the method is repeated for the modified path.

8. In this method, the RNC removes all the DHO nodes (except the RNC) from the path. That is, the original route is restored and the RNC is the only DHO node in the modified path.

9. In this method the RNC considers the delay increase and the maximum delay threshold already during the DHO node selection process. After retrieving the routes of the macro diversity legs from the topology database the RNC calculates the accumulated delay metrics for both directions for each route. The results are compared with the maximum allowed path delay and the delay metrics margin to the maximum delay is calculated for both directions for each route in, e.g. in the way described above.

Then the formation of the route tree, the identification of the branching nodes and their relative interconnections are performed in the same way as described above. The subsequent step, i.e. the actual selection of the best DHO node corresponding to each branching node, is, however, enhanced in that the delay metrics are considered in addition to the generic cost metrics.

When the RNC calculates the accumulated hop-by-hop generic cost metrics from a certain branching node to the DHO enabled nodes in the route tree, it also keeps track of the hop-by-hop delay metrics. When the DHO enabled node with the smallest accumulated generic cost metrics (measured from the branching node) is found, the RNC checks that the resulting added delay for each affected route (in each direction) is not greater than the remaining delay metrics margin to the maximum delay. The affected routes are those (original routes) that pass through the concerned branching node. The added delay in the downlink direction for a route is calculated as the accumulated hop-by-hop delay metrics roundtrip from the tentatively selected DHO node to the closest node that is included in the concerned route and back. The added delay in the uplink direction is calculated in the same way with the addition of a frame combining delay, unless this is the first DHO node to be selected for the concerned route (in which case no frame combining delay is added).

To integrate the calculation of the added delay with the cost metrics accumulation the RNC is arranged to do as follows. In its search for the best DHO enabled node corresponding to a certain branching node, each time the RNC "steps" away from a branching node (including the concerned branching node) where at least one of the affected routes divert from path that the RNC is "stepping" in the route tree, the RNC starts to accumulate the hop-by-hop delay metrics (in both directions) and continues to do so all the way to the DHO enabled node. Subsequently, when the RNC has tentatively selected a DHO node corresponding to the concerned branching node, the RNC has already (during the "stepping" process) calculated the accumulated hop-by-hop delay metrics roundtrip from the tentatively selected DHO node to the closest node included in each of the affected routes. Thus, the RNC is arranged to immediately check whether the remaining delay margin would be exceeded for any of the affected routes, if the tentatively selected DHO node were to be finally selected.

The RNC may also combine the (possibly somewhat inaccurate) delay metrics from the topology database with the more accurate delay measurement results from the Node Synchronisation procedure (similar to what is described above) in order to calculate more accurate delay margins. The initial delay margins (measured in terms of delay metrics from the topology database) for the downlink and the uplink could then be calculated as follows:

$$D_{marg\text{-}DL} = D_{top\text{-}old\text{-}DL} \times (D_{max}/D_{NS} - 1)$$

$$D_{marg\text{-}UL} = D_{top\text{-}old\text{-}UL} \times (D_{max}/D_{NS} - 1)$$

where $D_{marg\text{-}DL}$ and $D_{marg\text{-}UL}$ are the delay margins for the downlink and uplink respectively, $D_{max}$ is the maximum allowed delay and $D_{top\text{-}old\text{-}DL}$, $D_{top\text{-}old\text{-}UL}$ and $D_{NS}$ are the same as previously defined.

In order for this DHO node selection process with integrated delay checks to work well the RNC should start the DHO node selection process with the branching nodes in the lowest layer of the branching node hierarchy and continue with the branching nodes of the next hierarchical layer etc.

The consequences of the integrated delay checks for a tentatively selected DHO node can be divided into three different cases, depending on the number of the affected routes for which the remaining delay margin is not exceeded.

If the remaining delay margin is not exceeded for any of the affected routes, the RNC can safely select the DHO node. The RNC then reduces the remaining delay margin for the affected routes with their respective added delays and continues the DHO node selection process with the next branching node (if any).

If the remaining delay margin for one or more of the affected routes is exceeded, but there are at least two affected routes for which the remaining delay margin is not exceeded, then the DHO node can be selected for those of the affected routes that passed the delay check, but not for the other(s). The RNC then notes that the data paths of the macro diversity legs whose routes did not pass the delay check should bypass the selected DHO node. This note should make sure that this circumstance is reflected in the subsequently created DHO node tree. Finally the RNC reduces the remaining delay margin for the affected routes that passed the delay check with their respective added delays and continues the DHO node selection process with the next branching node (if any).

If the remaining delay margin for one or more of the affected routes is exceeded and only one or none of the affected routes passed the delay check, then no DHO node at all is selected for the concerned branching node. In this situation it would be possible for the RNC to check whether the second best DHO enabled node (or any other potential DHO node) could be selected, but the probability of finding one for which at least two of the affected routes pass the delay check is very low. Hence, in order not to complicate the DHO node selection process further the RNC might as well accept that no DHO node is selected for this branching node. The RNC notes this and makes sure that it is reflected in the subsequently created DHO node tree. The RNC then continues the DHO node selection process with the next branching node (if any).

Returning again to the DHO node selection example based on the example scenario in FIG. 5, which now continues with the delay reduction phase (since delay reduction method number 9, i.e. the above described delay checks integrated in the DHO node selection process, is not used in this example).

For the purpose of illustration (i.e. illustrating two alternative delay reduction methods) both delay reduction method number 5 and delay reduction method number 6 will be applied.

First it is assumed that delay reduction method number 5 is applied with a default frame combining delay value of 3. As previously mentioned the maximum allowed value of the delay measurement value based on the topology data (i.e. the delay metrics in the route tree) can differ between different data paths, because the delay metrics in the topology database may be somewhat inaccurate. However, in this example it is assumed that the maximum allowed accumulated delay metrics is 45 for all the data paths.

As can be derived from FIG. 9 the data path of NB1 has a downlink delay of 6 and the same value for the uplink delay. The data path of NB2 has a downlink delay of 34 and an uplink delay of 37. The data path of NB3 has a downlink delay of 24 and an uplink delay of 27. The data path of NB4 has a downlink delay of 45 and an uplink delay of 51. The data path of NB5 has a downlink delay of 55 and an uplink delay of 61.

Consequently the uplink delay for the data path of NB5 must be reduced by at least 61−45=16 and its downlink delay must be reduced by at least 55−45=10. Similarly the uplink delay for the data path of NB4 must be reduced by at least 51−45=6.

Figure 10:
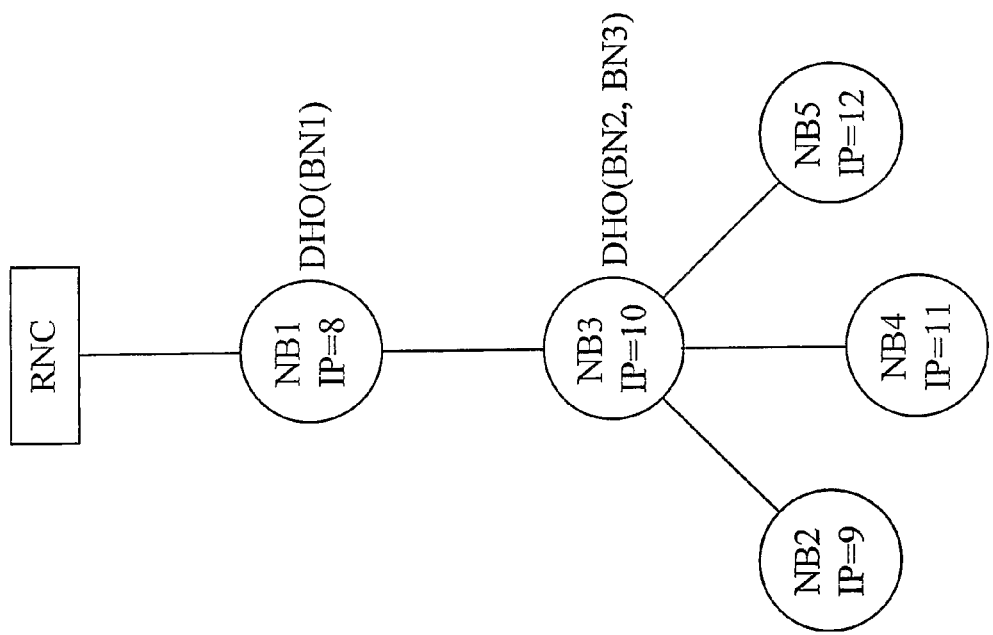
FIG. 10 shows the modified DHO node tree after the first step of the delay reduction method number 5 according to an embodiment.
Figure 11:
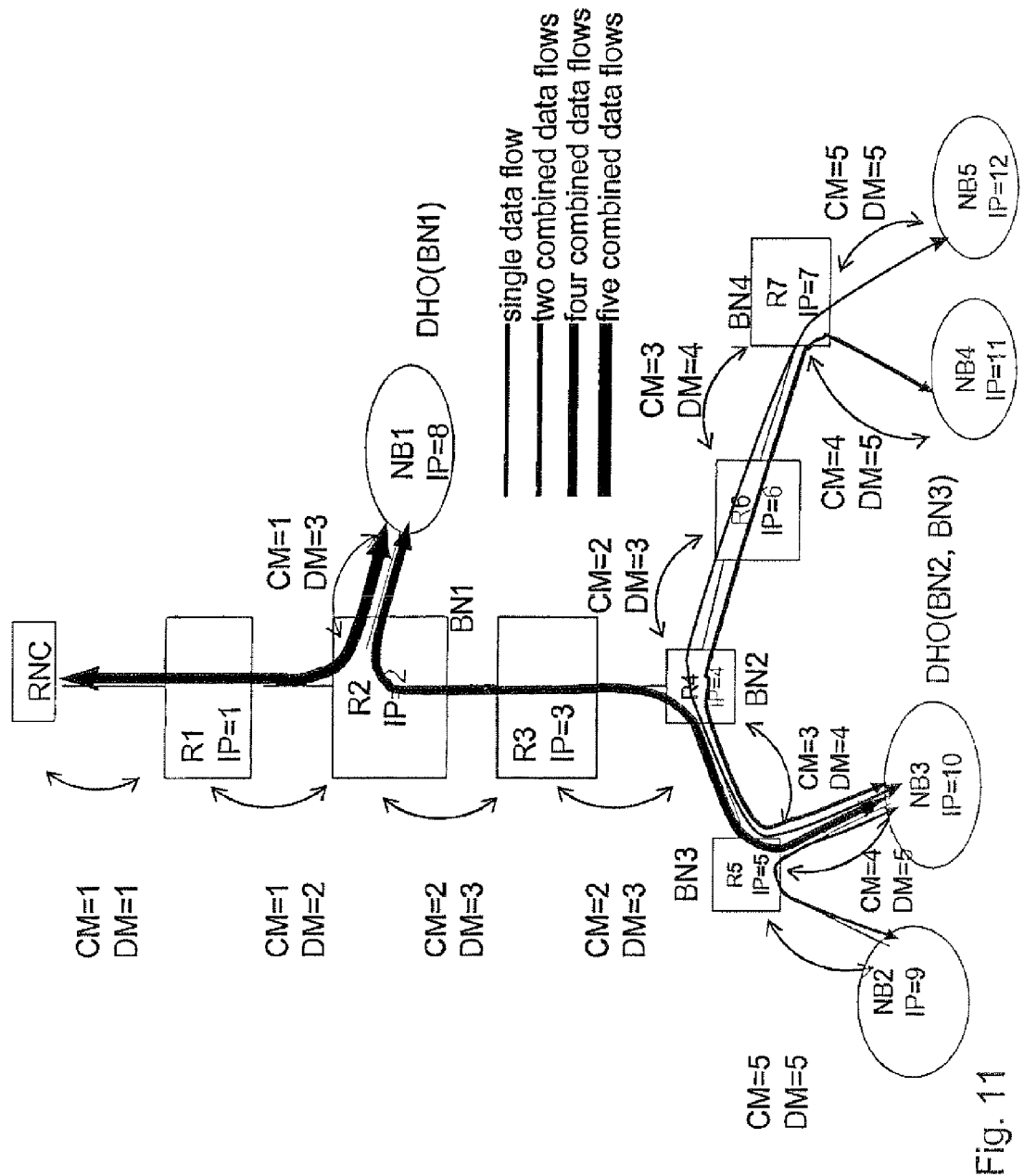
FIG. 11 shows the potential data flows in the route tree after the first step of the delay reduction method number 5.

The delay reduction method starts with the data path with the greatest delay reduction needs, i.e. the data path of NB5 in this example. According to delay reduction method number 5, the first DHO node in the path in the direction from the Node B to the RNC should be removed first (excluding DHO nodes that are included in the original RNC-Node B route retrieved from the topology database). This means that DHO node NB4 is removed from the data path of NB5 in the first step. The resulting modified DHO node tree table and DHO node tree are shown in table 5 and FIG. 10. The resulting potential data flows in the route tree are depicted in FIG. 11.

TABLE 5

The modified DHO node tree table after the first step of the delay reduction method number 5.

| DHO node | IP address (and node name) | Uplink connection | Downlink connections |
|---|---|---|---|
| DHO(BN1) | 8 (NB1) | RNC | DHO(BN2), IP = 10 (BN1 radio i/f) |
| DHO(BN2, BN3) | 10 (NB3) | DHO(BN1), IP = 8 | NB2, IP = 9 NB4, IP = 11 NB5, IP = 12 (NB3 radio i/f) |

Figure 12:
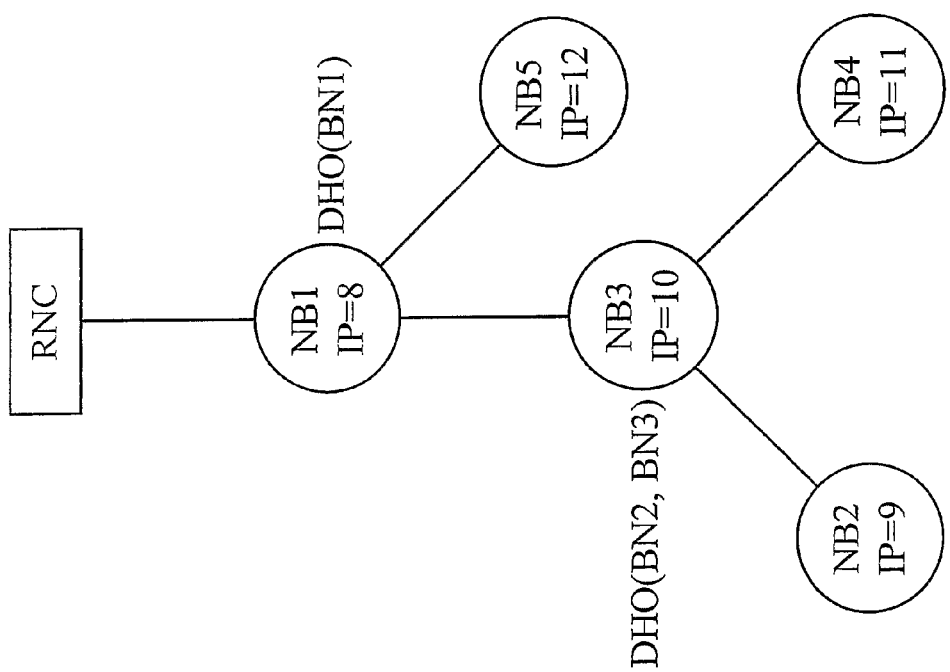
FIG. 12 shows the modified DHO node tree after the second step of the delay reduction method number 5 according to an embodiment.
Figure 13:
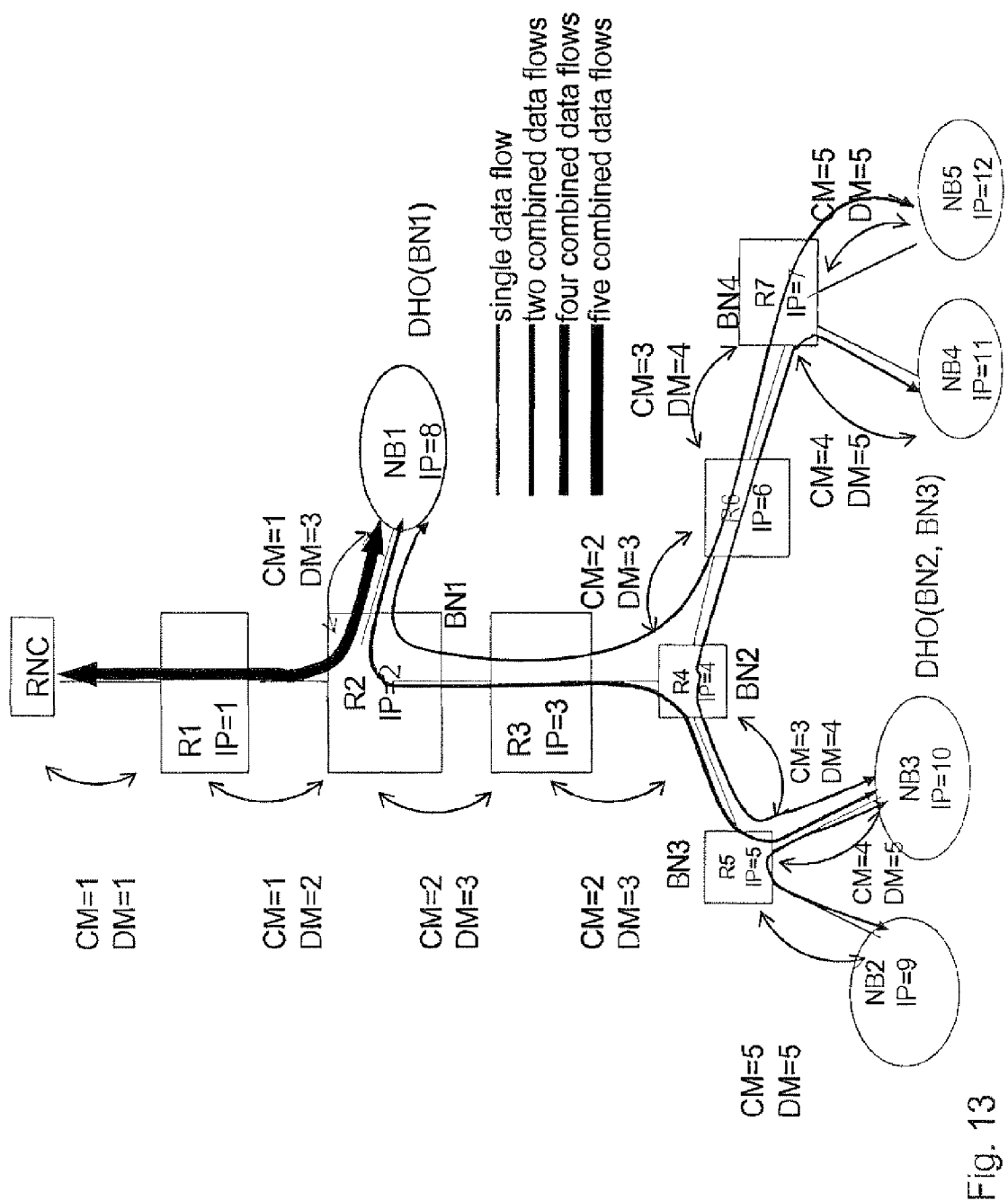
FIG. 13 shows the potential data flows in the route tree after the second step of the delay reduction method number 5.

This first step reduced the uplink delay of the data path of NB5 by 13 and the downlink delay by 10. This is enough for the downlink delay, but the uplink delay has to be reduced by another 3 units. Thus, according to the delay reduction method number 5 the next DHO node in the Node B to RNC direction of the data path of NB5 is removed. This means that the DHO node NB3 is removed from the data path of NB5 in the second step. The resulting modified DHO node tree table after the second step of the delay reduction method number 5 is shown in table 6 and the DHO node tree is shown in FIG. 12. The resulting potential data flows in the route tree are depicted in FIG. 13.

TABLE 6

| DHO node | IP address (and node name) | Uplink connection | Downlink connections |
| --- | --- | --- | --- |
| DHO(BN1) | 8 (NB1) | RNC | DHO(BN2), IP = 10<br>NB5, IP = 12<br>(BN1 radio i/f) |
| DHO(BN2, BN3) | 10 (NB3) | DHO(BN1), IP = 8 | NB2, IP = 9<br>NB4, IP = 11<br>(NB3 radio i/f) |

Figure 14:
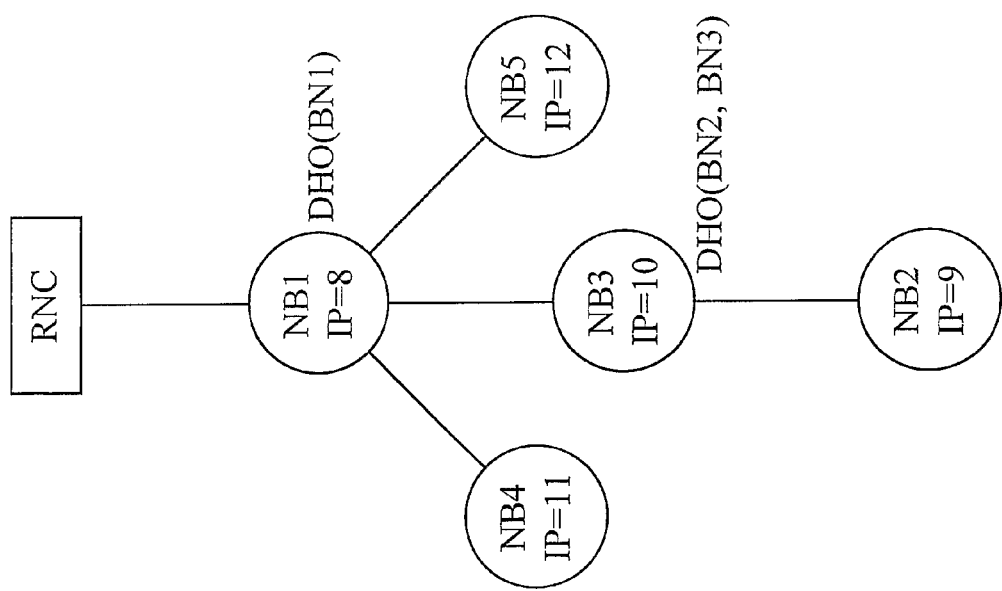
FIG. 14 shows the modified DHO node tree after the third step of the delay reduction method number 5 according to an embodiment of the invention.
Figure 15:
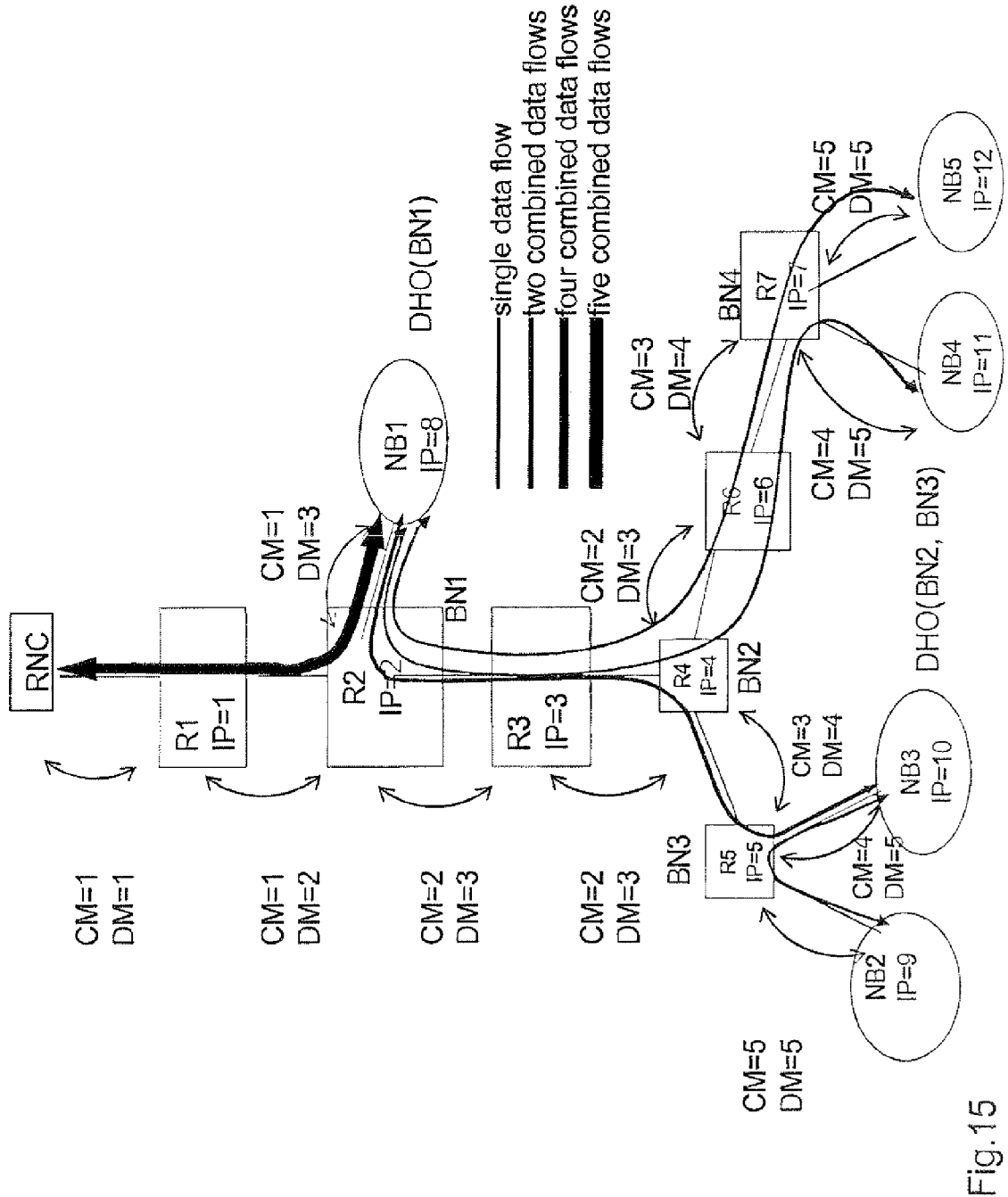
FIG. 15 shows the potential data flows in the route tree after the third step of the delay reduction method number 5.

The second step reduced the uplink delay of the data path of NB5 by 21 (and the downlink delay by 18). This is enough and the delay reduction for the path of NB5 is thereby finalized. Then the delay reduction method may be applied to the data path of NB4. As previously stated, the uplink delay of the data path of NB4 must be reduced by 6 units whereas the downlink delay needs no reduction. However, the removal of NB4 as a DHO node of the data path of NB5 means that NB4 no longer acts as a DHO node for the data path of NB4 either. Consequently, the uplink delay of the data path of NB4 has already been reduced by 3 units. Remaining to be reduced are another 3 units. According to the delay reduction method number 5, the first DHO node in the Node B to RNC direction should be removed from the data path of NB4. Thus, in the third step the DHO node NB3 is removed from the data path of NB4. The resulting modified DHO node tree table and DHO node tree after the third step of the delay reduction method number 5 are shown in table 7 and FIG. 14. The resulting potential data flows in the route tree are depicted in FIG. 15.

TABLE 7

| DHO node | IP address (and node name) | Uplink connection | Downlink connections |
| --- | --- | --- | --- |
| DHO(BN1) | 8 (NB1) | RNC | DHO(BN2),<br>IP = 10<br>NB4, IP = 11<br>NB5, IP = 12<br>(BN1 radio i/f) |
| DHO(BN2, BN3) | 10 (NB3) | DHO(BN1), IP = 8 | NB2, IP = 9<br>(NB3 radio i/f) |

Thus the third step reduced the uplink delay of the data path of NB4 by 21 (and the downlink delay by 18). This is enough and consequently the delay reduction for the entire DCH i.e. for all data paths is thereby finalized.

If instead delay reduction method number 6 would have been used in the example, the result would have been different. In the following, the delay reduction is restarted and the delay reduction method number 6 is used.

According to the delay reduction method number 6, according to one embodiment of the present invention, the DHO node for which the potential delay reduction is the smallest, but still greater than (or equal to) the required delay reduction, should be removed first. Starting again with the data path of NB5 (which is the data path that needs the greatest delay reduction) the potential delay reductions for the three DHO nodes are as follows. The removal of DHO node NB4 would reduce the uplink delay of the data path of NB5 by 13 and the downlink delay would be reduced by 10. The removal of DHO node NB3 would reduce the uplink delay of the data path of NB5 by 21 and the downlink delay would be reduced by 18. Finally, the removal of DHO node NB1 would reduce the uplink delay of the data path of NB5 by 6 (no frame combining delay would be saved since NB1 is the hierarchically highest DHO node in the path) and the downlink delay would be reduced by 6.

Figure 16:
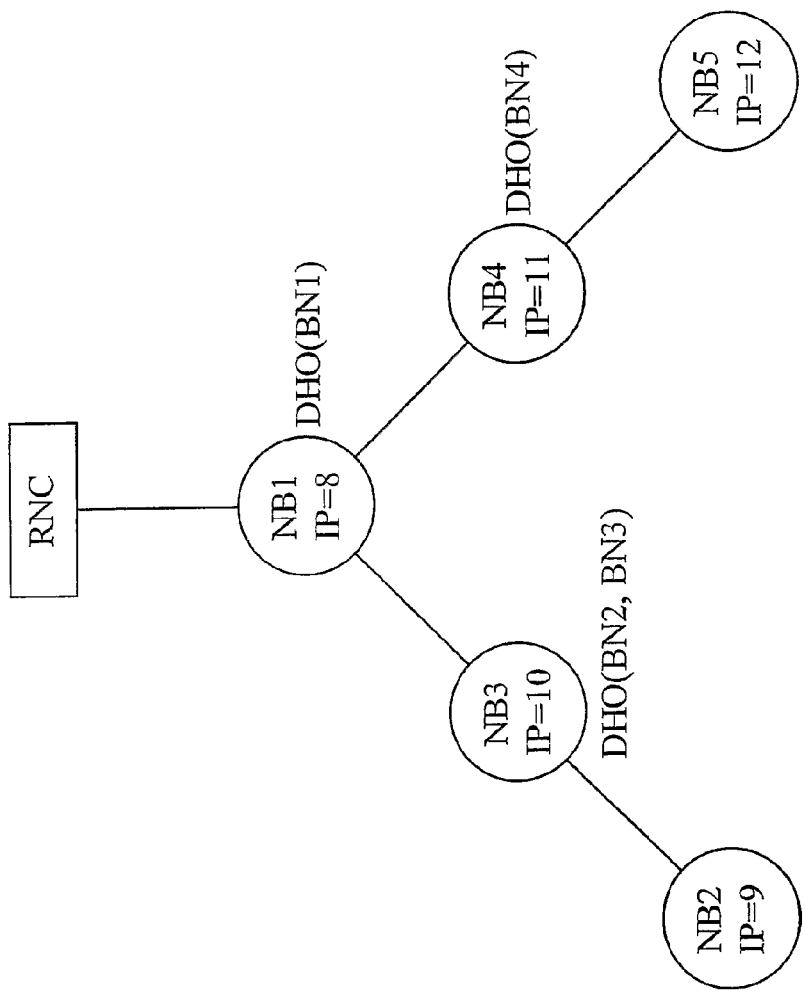
FIG. 16 shows the modified DHO node tree after the first step of the delay reduction method number 6 according to an embodiment.
Figure 17:
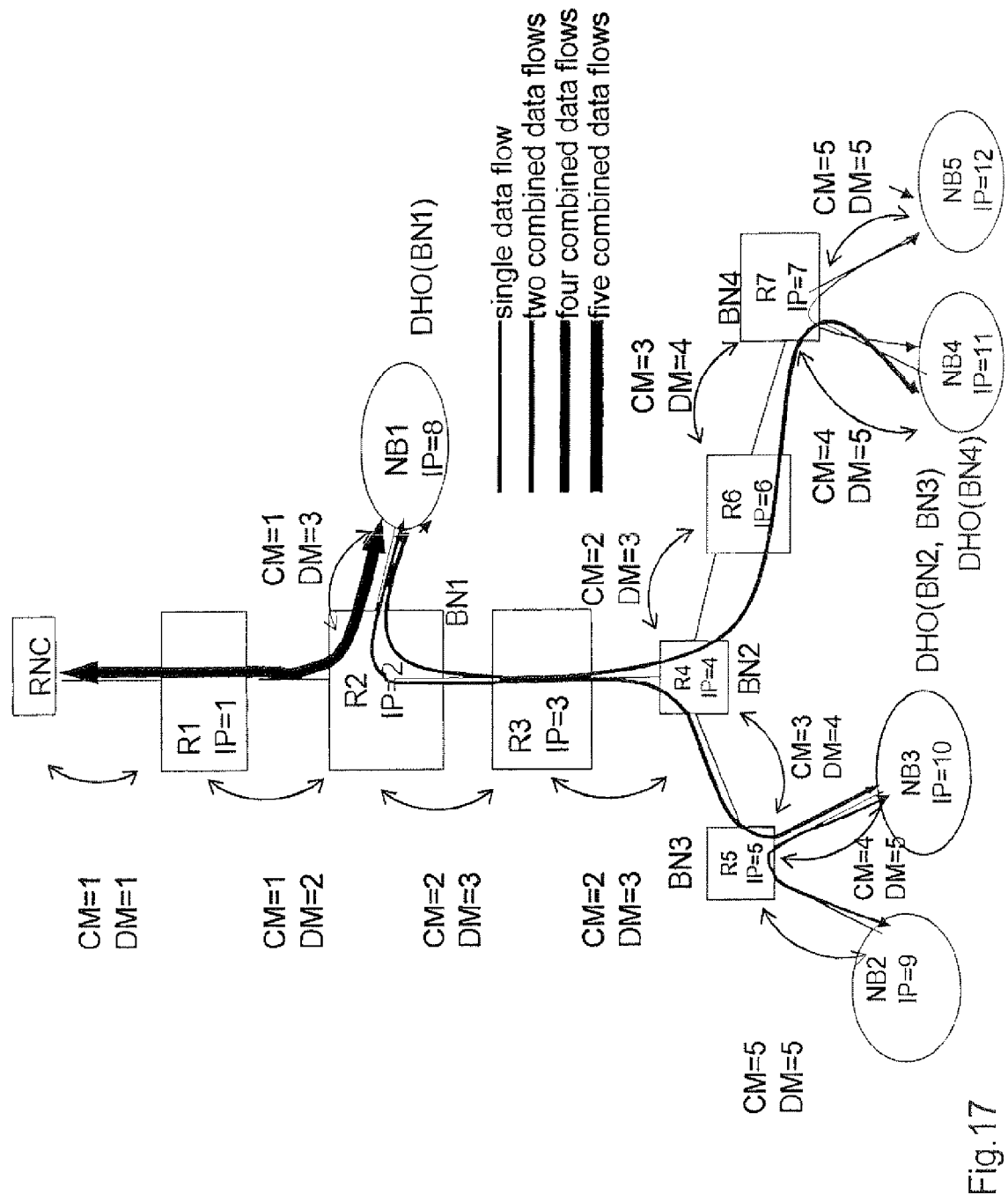
FIG. 17 shows the potential data flows in the route tree after the first step of the delay reduction method number 6.
Figure 18:
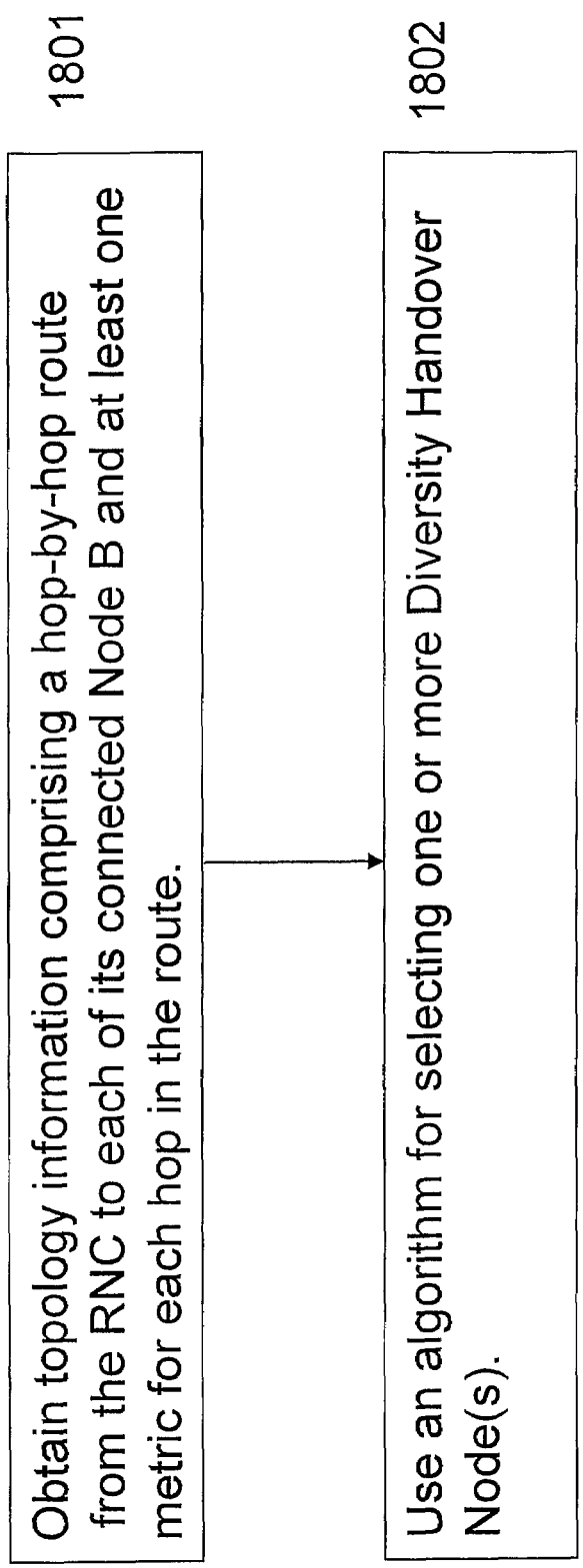
FIG. 18 is a flowchart of an example method.

Hence, because the required delay reduction for the data path of NB5 (as previously mentioned) is 16 in the uplink and 10 in the downlink, DHO node NB3 is the only one, whose sole removal is enough to reduce both the uplink and downlink delays of the data path of NB5 to acceptable values. Consequently DHO node NB3 is removed from the data path of NB5 in the first step of delay reduction method number 6. The resulting modified DHO node tree table and DHO node tree after the first step of delay reduction method number 6 are shown in table 8 and FIG. 16. The resulting potential data flows in the route tree are depicted in FIG. 17.

TABLE 8

The modified DHO node tree table after the first step of delay reduction method number 6.

| DHO node | IP address (and node name) | Uplink connection | Downlink connections |
| --- | --- | --- | --- |
| DHO(BN1) | 8 (NB1) | RNC | DHO(BN2),<br>IP = 10<br>DHO(BN4),<br>IP = 11<br>(BN1 radio i/f) |
| DHO(BN2, BN3) | 10 (NB3) | DHO(BN1), IP = 8 | NB2, IP = 9<br>(NB3 radio i/f) |
| DHO(BN4) | 11 (NB4) | DHO(BN1), IP = 8 | NB5, IP = 12<br>(NB4 radio i/f) |

After this step the delay reduction for the data path of NB5 is finalized. Then the delay reduction method may be applied to the data path of NB4. As previously stated the uplink delay of the data path of NB4 must be reduced by 6 units (whereas the downlink delay needs no reduction). However, the removal of NB3 as a DHO node in the data path of NB5 has affected the delay of the data path of NB4 too. The reason is that the data flow constituting the part of the data path of NB5, from which DHO node NB3 was removed, is combined with the data flow of NB4. Hence, when DHO node NB3 was removed from the data path of NB5, it was also removed from the data path of NB4. The uplink and downlink delay reductions are the same for the data path of NB4 as they were for the data path of NB5, i.e. an uplink delay reduction of 21 and a downlink delay reduction of 18. This is more than required and thus the delay reduction for the data path of NB4 is also finalized. Consequently the delay reduction for the entire DCH (i.e. all the data paths) is finalized.

The final DHO node tree is then the basis for instructions to the selected DHO nodes and the establishment of transport bearers.

A DHO Node Selection Algorithm for Cascaded Base Stations

In a UTRAN topology with cascaded base stations the base stations are interconnected in a sequence. That is, the path from the RNC to the last base station in a sequence of cascaded base stations passes through all the other base stations in the sequence. A RNC may connect several sequences of cascaded base stations, each of which having no part of its data path in common with the other sequences. Cascaded base stations may also be combined with a UTRAN tree topology. In such case one or several branches of a tree may comprise cascaded base stations. Yet a variation of the cascaded base stations topology is to interconnect the cascaded base stations and the RNC in a loop, such that both ends of the sequence of cascaded base stations are connected to the RNC. The purpose of such a loop is to provide transport path redundancy in case a link in the loop is temporarily malfunctioning.

The hierarchical macro diversity scheme, wherein the macro diversity functionality is distributed to the Node Bs, is most beneficial in a UTRAN topology with cascaded Node Bs. It may hence be useful to design a DHO node selection algorithm that is tailored for cascaded Node Bs. Such a DHO node selection algorithm could be made very simple, but could only be used for macro diversity among Node Bs within a single sequence of cascaded Node Bs. The DHO node for legs involving Node Bs from different sequences of cascaded Node Bs would have to be selected using a more generic algorithm e.g. the one described above. The simplest solution would be to choose the RNC as the DHO node for such macro diversity legs. Macro diversity between legs involving one Node B in a sequence of cascaded Node Bs and another Node B located in another UTRAN topology would be handled in the same way.

For the macro diversity legs involving only (DHO enabled) Node Bs belonging to the same sequence of cascaded Node Bs the DHO nodes is selected as follows. Of the radio active Node Bs, i.e. the Node Bs that are responsible for the radio link part of a macro diversity leg, the one that is the closest to the RNC in terms of number of hops is selected as the DHO node for its own data flow, i.e. the data flow across the radio interface, and the data flow to and from the radio active Node B that is the next closest to the RNC. The active node that is the next closest to the RNC is selected as the DHO node for its own data flow and the data flow to and from the next radio active Node B (as seen in the direction from the RNC). This algorithm is repeated until the last radio active Node B is reached (i.e. the radio active Node B that is the furthest away from the RNC in terms of number of hops). This last radio active Node B is the only one that will not act as a DHO node.

This algorithm assumes that all the Node Bs in the sequence of cascaded Node Bs (or at least the radio active Node Bs in the sequence) are DHO enabled. If not all the Node Bs in the sequence of cascaded Node Bs are DHO enabled, the algorithm may be extended with the following rule. If one of the radio active Node Bs, except the one furthest away from the RNC, cannot act as a DHO node because it is not DHO enabled, it is replaced (as a DHO node) by the next available DHO enabled node in the direction of the RNC. This next available DHO enabled node may be another radio active Node B, a non-radio active Node B, the RNC or even a future type of RNL node (e.g. a specialised DHO node). However, if the DHO node selection algorithm is designed to select DHO nodes only from the radio active Node Bs (and the RNC) then a non-radio active DHO node or a future type of RNL node cannot replace a non-DHO enabled radio active Node B as a DHO node.

For these simple topologies the topology information may be manually or semi-automatically configured in the RNC (but automatic mechanisms are of course possible also in this case). It is even possible to configure the RNC only with information about the sequential order of the cascaded Node Bs, disregarding the other transport network related information. This is all the RNC is required to know in order to select DHO nodes in this special case.

This DHO node selection algorithm is not only applicable to Node Bs that are strictly cascaded on the IP level or AAL2 level. It may also be applied to a sequence of cascaded Node B sites, where each Node B site include a Node B co-located with a router. In such a scenario, the Node Bs would, from a strict network topology perspective, be regarded as interconnected in a tree structure. However, due to the potentially low cost and low delay of the intra-site link between the router and the Node B, using these Node Bs as DHO nodes would be almost equally beneficial as using the strictly cascaded Node Bs as DHO nodes. To use such Node Bs as DHO nodes the RNC should be configured with the sequential order of the Node Bs (i.e. strictly speaking the sequential order in which the Node B sites are interconnected), disregarding that the network topology strictly is a tree structure. Then the above described algorithm (for selection of DHO nodes in a cascaded Node B network topology) could be used as it is. It would of course also be possible to use this method when strictly cascaded Node Bs and Node Bs co-located with routers are mixed in the same sequence.

Using Off-tree DHO Enabled Nodes in the DHO Selection Algorithm

In certain cases the DHO node selection process could arrive at more optimal DHO node trees, if off-tree DHO enabled nodes (i.e. DHO enabled nodes that are not included in the original route tree) could also be selected as DHO nodes. This would be particularly useful if the UTRAN transport network has a meshed topology, but in certain cases it would be beneficial also in transport networks with tree topology or hybrids of tree topology and cascaded base stations. An example of such a case is when the off-tree DHO enabled node is a Node B that is co-located with a router that is a branching node in the route tree. Such a Node B would be a beneficial choice of DHO node, despite its off-tree location. (Even though the Node B is co-located with an on-tree router, it is regarded as an off-tree node, because from a pure network topology perspective the Node B is located one hop away from the co-located router.)

To enable selection of off-tree DHO enabled nodes the RNC could maintain additional information for each node (at least each non-DHO enabled node) in its topology database. For each node this additional information would indicate the closest DHO enabled node (represented by an IP address or an ATM address) and the accumulated delay and generic cost metrics (in both directions) for the path between the concerned node and its closest DHO enabled node. For a node that is itself a DHO enabled node this associated information would either not be present or indicate the node itself as the closest DHO enabled node with the accumulated delay and generic cost metrics both set to zero. This information may also be kept in a separate database.

To create this information when the traceroute method is used the RNC keeps a separate database including each router in the RNS. The RNC notes the destination Node B as the closest DHO enabled node for each router in the route, when a traceroute measurement is performed. The information is potentially inserted in the separate database. If a closest DHO enabled node is already stored for a router in the separate database, then the destination Node B replaces the stored DHO enabled node as the closest DHO enabled node only if the accumulated generic cost metrics from the router to the destination Node B is smaller than the accumulated generic cost metrics from the router to the already stored closest DHO enabled node. This traceroute based method to locate the closest DHO enabled node for each router in the RNS works well for cascaded base stations and tree topology UTRANs, but it does not work well if a meshed transport network topology is used.

When performing the calculations of accumulated generic cost metrics, as described above in conjunction with the DHO node selection algorithm, for DHO node selection or for calculation of potential cost increase (as a result of a potential DHO node removal), it should be taken into account a fundamental difference between off-tree and on-tree DHO enabled nodes. For an on-tree DHO enabled node there will always be at least one data flow to and from the node's uplink interface, whether the node is selected as a DHO node or not. However, this is not the case for an off-tree DHO enabled node. If the off-tree DHO enabled node is not selected as a DHO node, there will be no data flow to or from the node in any direction. Thus, the data flows between an off-tree DHO node's uplink interface and the original route tree must be considered in the calculations, since it represents a cost increase resulting from the selection of the off-tree node as a DHO node. Hence, an off-tree DHO enabled node is not likely to be selected, unless the accumulated generic cost metric from the corresponding branching node to the off-tree DHO enabled node is very low, like e.g. if the off-tree DHO enabled node is a Node B that is co-located with the concerned branching node.

When selecting the DHO node corresponding to a certain branching node, the RNC should consider the DHO enabled node indicated in the topology information as the DHO enabled node closest to the branching node in addition to the on-tree DHO enabled nodes.

Realization of a DHO Node Tree

When the DHO nodes, also referred to as macro diversity nodes, are selected according to the method and arrangements of the present invention, the RNC is arranged to instruct the DHO nodes and other affected nodes so that the intended macro diversity is established. The DHO nodes perform the following steps by utilizing NBAP and in the inter-RNS case also RNSAP:

For the downlink:

The DHO nodes are adapted to split the downlink flow and to forward the resulting flows according to the instructions received from the RNC using the transport bearers previously established according to the instructions received from the RNC. The instructions to direct the data flows between the involved nodes may comprise IP addresses and UDP ports in an IP-based UTRAN or ATM addresses and SUGR (Served User Generated Reference) references in an ATM-based UTRAN.

When unmodified NBAP and RNSAP is used the DHO nodes may be adapted to split the downlink flow and to forward the resulting flows according to implicit information in the uplink data flow received from hierarchically lower nodes.

This implicit information consists of source IP addresses and UDP ports retrieved from the IP header and UDP header of received uplink packets.

For the uplink:

The DHO nodes are adapted to combine the uplink flows to a single uplink flow that is forwarded according to the instructions received from the RNC using a previously established transport bearer. The instructions may comprise IP addresses in an IP-based UTRAN or ATM addresses and SUGR parameters in an ATM based UTRAN. When unmodified NBAP and RNSAP are used the DHO nodes are adapted to identify the uplink flows to be combined through information retrieved from uplink packets received from hierarchically lower nodes.

The Node Bs with DHO functionality preferably use an adaptive timing scheme to optimise the trade-off between delay and frame loss in the uplink combining.

It should be understood that the method using instructions or other means to establish the macro diversity in accordance with the (logical) DHO node tree is independent of the method that is used to obtain or create the (logical) DHO node tree.

If a transport network control plane protocol is used, the selected Node Bs with DHO functionality use this control plane protocol to establish the inter-Node B transport bearers according to the instructions from the RNC. Examples of such transport network control plane protocols are Q.2630 (for AAL2 connections) in an ATM based UTRAN and the control plane protocol being developed by the NSIS (Next Step In Signaling) workgroup in the IETF (Internet Engineering Task Force) in an IP based UTRAN.

To establish a hierarchical macro diversity structure the selected DHO nodes should be instructed so that they know where to send split downlink flows and what uplink flows to combine. These DHO node instructions are based on the DHO node tree that is the outcome of the DHO node selection process. Every time the DHO node tree changes (due to addition or removal of macro diversity legs) all the affected nodes (both DHO nodes and non-DHO Node Bs) need new instructions. Instructions are also needed when DCHs are added or removed from all macro diversity legs. DHO nodes may also in accordance with an embodiment of the present invention need QoS instructions when DCHs are modified in a way that the QoS of their transport bearers have to be changed. The affected nodes may range from a single to all Node Bs in the DHO node tree. No signaling is required when only the S-RNC is affected.

In order to direct the DCH data flows in accordance with the DHO node tree the RNC should provide the involved Node Bs with the IP addresses and UDP ports (in an IP UTRAN) or ATM addresses and SUGR parameters (in an ATM UTRAN) that they need to establish the inter-Node B transport bearers. If a transport network control plane protocol is used, the Node Bs handle this transport network control plane signaling between themselves and intermediate routers or AAL2 switches for inter-Node B transport bearers. However, there is no inter-Node B RNL signaling.

To direct a transport bearer between a DHO node or a leaf Node B (in the DHO node tree) and a hierarchically higher DHO node or the RNC in an IP UTRAN without a transport layer control plane protocol, the RNC conveys to the DHO node or leaf Node B the destination IP address and UDP port to be used in the uplink direction of the transport bearer. That is, in essence, unless the hierarchically higher node is the RNC itself, the RNC replaces an IP address and a UDP port of the RNC (that would have been included in the message if distributed macro diversity had not been used) by an IP address and a UDP port of the hierarchically higher DHO node. The receiving node returns the destination IP address and UDP port to be used in the downlink direction of the transport bearer.

In an ATM UTRAN or an IP UTRAN with a transport layer control plane protocol no address (i.e. ATM address or IP address) or transport bearer reference (i.e. SUGR parameter or UDP port) has to be conveyed to a DHO node or leaf Node B to direct a transport bearer between the DHO node or leaf Node B and a hierarchically higher DHO node or the RNC. In these cases the transport bearer is established from the hierarchically higher node (i.e. a DHO node or the RNC) and the hierarchically lower node does not have to know the destination parameters of the uplink direction of the transport bearer in advance. However, the hierarchically lower node has to be prepared in advance for the coming transport bearer establishment and it has to allocate destination parameters (ATM address and SUGR parameter or IP address and UDP port) for the downlink direction of the transport bearer to be used when the transport bearer is established. These parameters are returned to the RNC in response to the message that prepares the hierarchically lower node for the coming transport bearer establishment from a hierarchically higher node.

To direct a transport bearer between a DHO node and a hierarchically lower DHO node or leaf Node B (in the DHO node tree) in any type of UTRAN (i.e. an ATM UTRAN or an IP UTRAN with or without a transport layer control plane protocol), the RNC conveys to the DHO node the destination parameters (i.e. ATM address and SUGR parameter or IP address and UDP port) for the downlink direction of the transport bearers. This is information that is not included in regular NBAP (or RNSAP) messages. The RNC had previously retrieved these destination parameters from the hierarchically lower DHO node or leaf Node B, when this hierarchically lower node was prepared for or received direction for the establishment of the transport bearer towards the hierarchically higher node.

Note that when a node establishes a transport bearer towards a hierarchically lower node, this transport bearer is from the viewpoint of the hierarchically lower node a transport bearer towards a hierarchically higher node.

Along with the transport bearer direction information the RNC may also send explicit QoS information to be used for the inter-Node B transport bearers. This may be e.g. in the form of DiffServ code points, QoS class indications or bandwidth and delay indications. Other instructions may be timing instructions for the uplink combining function and time indications for activation of the DHO instructions.

However, the required QoS information may also be implicitly derived from the DCH characteristics signaled via NBAP (and possibly RNSAP). Yet a possibility is to copy the QoS class used for the transport bearers towards the hierarchically higher node (in the DHO node tree) for the transport bearers towards the hierarchically lower node(s) (in the DHO node tree).

In some cases a changed DHO node tree implies that several data paths need to be changed in order to form a complete Node B-RNC path for a macro diversity leg. In such cases the RNC may choose to synchronize the switching from old to new data paths at a certain CFN in order to avoid data loss. The RNC then associates with the DHO instructions a time indication (in the form of a CFN) that indicates the CFN when the DHO instructions are to be effectuated in the receiving node.

To convey all these instructions to the involved Node Bs the RNC uses existing unchanged NBAP messages (and RNSAP messages), existing modified NBAP messages (and RNSAP messages) and even new NBAP messages (and RNSAP messages).

One aspect of the DHO related signaling is associated with the inter-RNS case. In the inter-RNS case the D-RNC more or less relays the information between the S-RNC and the Node Bs, using RNSAP towards the S-RNC and NBAP towards the Node Bs. It is however not a strict relay, since the D-RNC converts between two protocols.

Since the DHO related information in an RNSAP message sent from the S-RNC to a D-RNC may be intended for any of the Node Bs in the RNS of the D-RNC, there must be a way for the S-RNC to indicate the intended recipient of the DHO related information. The preferred way to do this is to include a transport layer address (i.e. an IP address or an ATM address) of the intended recipient node together with the DHO related information that is included in an RNSAP message. This transport layer address should be the same address as the one that is used to represent the node in the topology information, because this address is the only address of the node that the S-RNC is guaranteed to know. However, if the intended recipient node is the D-RNC, the included transport layer address may be any address of the D-RNC that the S-RNC knows, e.g. the one that is used in the topology information or the one that is used as the destination address for the transport bearer used for the concerned RNSAP message. Likewise a transport layer address may be associated with DHO related information in RNSAP messages sent in response from a D-RNC to a S-RNC.

If inter-RNS DCH transport bearers are always terminated in the D-RNC (which is possible according to the 3GPP standard), then no extension or modification of the RNSAP signaling is needed for the inter-RNS case of distributed DHO functionality. Instead the D-RNC can handle the distributed macro diversity mechanisms (i.e. selection of DHO nodes, providing DHO instructions, etc.) within its own RNS by itself independently of the S-RNC (provided that the S-RNC has not indicated that the D-RNC must not perform DHO functionality for a particular macro diversity leg).

In another embodiment of the present invention the RNC realizes the DHO node tree, i.e. directs the transport bearers in accordance with the DHO node tree, using unmodified NBAP and RNSAP protocols. The regular message formats are used and no new parameters are introduced.

It should be understood that this method to execute the macro diversity in accordance with the (logical) DHO node tree is independent of the method that is used to obtain or create the (logical) DHO node tree.

The embodiment without protocol modifications can only be used in an IP UTRAN without an IP control plane protocol. The reasons for this will be apparent from the further description of the solution.

Using existing unmodified NBAP means that no DHO instructions that require new types of parameters in the NBAP messages may be used. This has consequences for the direction of data flows, the QoS instructions for the inter-Node B transport bearers as well as the initiation of DHO functionality in a Node B. Another consequence is that only radio active Node Bs are arranged to act as DHO nodes. Non-radio active nodes, including D-RNCs (but excluding the S-RNC), are not possible as DHO nodes.

A DHO node in an IP UTRAN allocates the same IP address and UDP port for all transport bearers related to the same DCH. That is, all the received data flows pertaining to the same DCH arrive at the same IP address and UDP port (including the downlink flow from a hierarchically higher node in the DHO node tree as well as uplink flows from hierarchically lower nodes). The DHO node looks at the source IP address of the received IP packets in order to distinguish IP packets from the different flows of the same DCH (e.g. a downlink flow and one or several uplink flows). The DHO node will also use the same IP address and UDP port as source address and source port for the corresponding flows in the opposite directions. A DHO node combines all uplink flows arriving at a certain IP address and UDP port with each other and, if the DHO node is a radio active Node B, with the node's own uplink flow arriving across the radio interface. The DHO node also knows that for each combined uplink flow there should be a corresponding split downlink flow sent to the same IP address and UDP port as the uplink flow uses as source IP address and UDP port. If the DHO node is a radio active Node B, it should of course also send a split downlink flow across the radio interface. This principle is crucial for the solution with unmodified protocols, but it is valid also for the solution using modified protocols.

In the description below a hierarchically higher or lower node always refers to the hierarchy of the DHO node tree of a DCH.

As will be seen below the initiation and termination of DHO functionality in a DHO node is tightly coupled with the direction of data flows in this solution.

Existing NBAP messages and parameters allow the RNC to instruct a Node B of the destination IP address and UDP port that should be used in the uplink direction of a DCH transport bearer towards a hierarchically higher node. When the DHO functionality is not distributed, these parameters are an IP address and a UDP port of the RNC itself. NBAP does however not include any means for instructing a Node B of what parameters to use for a transport bearer towards a hierarchically lower node. This is because there is no need for such instructions in a UTRAN without distributed DHO functionality.

To direct a transport bearer between a DHO node or a leaf Node B (in the DHO node tree) and a hierarchically higher DHO node or the RNC, the RNC conveys to the DHO node or leaf Node B the destination IP address and UDP port to be used in the uplink direction of the transport bearer in the same way as in the solution with modified protocols. That is, in essence, unless the hierarchically higher node is the RNC itself, the RNC replaces an IP address and a UDP port of the RNC (that would have been included in the message if distributed macro diversity had not been used) by an IP address and a UDP port of the hierarchically higher DHO node. The receiving node returns the destination IP address and UDP port to be used in the downlink direction of the transport bearer.

Instructions pertaining to transport bearers towards a hierarchically lower node, i.e. direction of a split data flow, are trickier and have to be coupled with the mechanism for initiation of DHO functionality in a DHO node.

As stated above the RNC may not explicitly instruct a DHO node of what destination IP address and UDP port to use for a transport bearer towards a hierarchically lower node. Actually, the RNC may not even explicitly inform a Node B that it has been selected as a DHO node and when the DHO functionality should be initiated or terminated. Instead a DHO enabled Node B can rely on implicit information in the data flows to trigger initiation and termination of the DHO functionality and to find out where to direct split data flows.

A DHO enabled Node B checks the source address of all the IP packets it receives at the IP address and UDP port allocated to the transport bearer(s) of a certain DCH. If a packet with a source address other than that of the next hierarchically higher node (or one of its next hierarchically lower nodes if the Node B is already acting as a DHO node) is received, this packet has to originate from a hierarchically lower node. This indicates to the Node B that it has become a DHO node for a new macro diversity leg of the concerned DCH and the destination IP address and UDP port to use for the split downlink flow for the new macro diversity leg are the same as the source IP address and UDP port of the received packet. The Node B then initiates the required DHO functionality and starts to perform splitting and combining accordingly. This principle cannot be used in an ATM UTRAN or an IP UTRAN with a transport layer control plane protocol, because in these types of UTRAN a Node B cannot send data to a hierarchically higher node, until the hierarchically higher node has established the transport bearer towards the Node B.

The Node B may not receive any explicit QoS instructions for the new transport bearer towards the hierarchically lower node, so if needed, the Node B can derive the required QoS information from the DCH characteristics (which is already known in the Node B) or copy the QoS class (e.g. DiffServe code points) used for the transport bearer of the same DCH towards the next hierarchically higher node.

When a Node B acting as a DHO node detects that a hierarchically lower node is no longer using a macro diversity leg, it should terminate the DHO functionality for that macro diversity leg.

It should be noted that all the methods for identifying the originating Node B of an uplink Node Synchronisation DCH FP control frame that were described for the embodiment with modified NBAP (and RNSAP) also may be used for the embodiment with unmodified protocols To summarize, the method for selecting a DHO node, i.e. a Node B or an RNC or another type of node comprising (and executing) a macro diversity functionality in a mobile telecommunication system wherein the macro diversity functionality is distributed to one or a plurality of DHO nodes such as a Radio Network Controller, RNC, and its connected Node Bs in said network, comprises according to the present invention the steps of:

1801. Obtain topology information comprising a hop-by-hop route from the RNC to each of its connected Node Bs and at least one metric for each hop in the route.

1802. Use an algorithm for selecting one or more DHO node(s).

When the DHO nodes are selected the method for instructing the relevant nodes is then performed according to an embodiment of the present invention. Other ways of instructing the relevant nodes, i.e. realizing the DHO node tree, may also be used without changing the DHO node selection procedure.

The method above may be implemented by a computer program product. The computer program product is directly loadable into the internal memory of a computer within a Radio Network Controller and/or a Node B in a mobile telecommunication network, and comprises the software code portions for performing the steps of said method. Furthermore, the computer program product is stored on a computer usable medium, and comprises readable program for causing a computer, within a Radio Network Controller and/or a Node B in a mobile telecommunication system, to control an execution of the steps of said method.

Thus, the RNC can include means for obtaining topology information comprising a hop-by-hop route from the RNC to each of its connected Node Bs and at least one metric for each hop in the route, and means for using an algorithm for selecting a DHO node.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for selecting one or more Diversity Handover, DHO, nodes executing a macro diversity functionality, in a mobile telecommunication network wherein the macro diversity functionality is distributed to one or a plurality of DHO nodes including a Radio Network Controller, RNC, its connected Node B(s) in said network, and any DHO enabled node(s) therebetween, the method comprising:

a. obtaining topology information comprising a hop-by-hop route from the RNC to each of its connected Node Bs and at least one metric for each hop in the route, and b. using an algorithm for selecting one or more DHO node(s), whereby the algorithm comprises:

forming a macro diversity tree of the routes based on the obtained topology information, and selecting the Node B(s) and/or the RNC and/or other DHO enabled node(s), that result in a best accumulated metric for all potential data flows between the RNC and its connected Node B(s) in the macro diversity tree of routes, as the DHO node(s), c. checking that a maximum allowed delay is not exceeded for a data path for each of the selected one or more DHO node(s) by using a delay metric from the topology information, and when the maximum allowed delay is exceeded, performing a delay reduction procedure until the maximum allowed delay is not exceeded, wherein the delay reduction procedure comprises removing one or more already selected DHO nodes from the path.

2. The method according to claim 1, wherein the topology information further comprises for each non-DHO enabled node in the topology information an indication of a closest DHO enabled node.

3. The method according to claim 1, wherein the forming-step comprises:

identifying branching nodes in said tree of routes, and identifying the relative interconnections of said branching nodes and the connections to Node Bs and the RNC of said branching nodes.

4. The method according to claim 1, wherein the at least one metric comprises the delay metric and a generic cost metric and wherein the step of selecting the DHO Node(s) with the best accumulated metric comprises:

selecting the DHO node(s) resulting in the smallest accumulated cost for all potential data flows between the RNC and its connected Node B(s) in the macro diversity tree, as the DHO node(s), when the accumulated cost is substantially the same for two or more potential DHO nodes, selecting as the DHO node the potential DHO node that results in the smallest accumulated delay metric for all potential data flows between the RNC and its connected Node B(s) in the macro diversity tree.

5. The method according to claim 1, wherein the at least one metric comprises a generic cost.

6. The method according to claim 1, wherein the at least one metric comprises the delay metric.

7. The method according to claim 6, further comprising:

combining the delay metric with node synchronisation measurement in order to determine if the maximum allowed delay is exceeded.

8. The method according to claim 1, wherein the at least one metric comprises the delay metric and a generic cost metric and wherein the step of selecting the DHO Node(s) with the best accumulated metric comprises:

tentatively selecting a potential DHO node, checking whether a delay of a potential data flow between the RNC and one of its connected Node Bs would exceed the maximum allowed delay if it were to traverse the potential DHO node, and selecting the potential DHO node as the DHO node for said potential data flow if said maximum allowed delay is not exceeded.

9. The method according to claim 1, wherein the topology information is obtained through manual or semi-automatic management operations in the RNC.

10. The method according to claim 1, wherein the topology information is obtained via a link state routing protocol used in a transport network.

11. The method according to claim 1, wherein the topology information is obtained by using a traceroute mechanism that allows the RNC to discover the hop-by-hop route to each Node B.

12. The method according to claim 1, wherein the topology information is obtained by retrieving the topology information from a neighboring RNC in the network.

13. The method according to claim 1, further comprising:

preparing a DHO related signaling message to be conveyed to a DHO tree node that is a node that is or is planned to be a part of the macro diversity tree, including in the signaling message one or more transport layer addresses and one or more transport bearer reference parameters in order to direct one or more inter-DHO tree node data flows of the macro diversity tree, and sending said signaling message to said DHO tree node in order to provide DHO related instructions to said DHO tree node.

14. The method according to claim 13, further comprising:

replacing the transport layer address and transport bearer reference parameter of the RNC by the transport layer address and transport bearer reference parameter of a DHO tree node that is hierarchically higher than said DHO tree node in a regular signaling message sent to said DHO tree node in order to direct a data flow between said DHO tree node and said higher DHO tree node in the DHO tree node hierarchy.

15. The method according to claim 13, wherein the including step comprises:

including one or more transport layer addresses and one or more transport bearer reference parameters of one or more DHO tree node(s) that are hierarchically lower than said DHO tree node in a signaling message sent to said DHO tree node in order to direct one or more data flows between said DHO tree node and said one or more lower DHO tree node(s) in the DHO node hierarchy.

16. The method according to claim 13, wherein said transport layer addresses are IP addresses and said transport bearer reference parameters are UDP ports.

17. The method according to claim 13, wherein said transport layer addresses are ATM addresses and said transport bearer reference parameters are SUGR parameters.

18. The method according to claim 13, further comprising:

including in the signaling message Quality of Service (QoS) indications for the data flow(s) to be directed.

19. The method according to claim 13, further comprising:

including timing parameters in the signaling message to be used in an uplink combining procedure in the DHO tree node receiving said signaling message.

20. The method according to claim 13, further comprising:

including a time indication in the signaling message indicating when the DHO related instructions in the signaling message are to be effectuated in the DHO tree node receiving said signaling message.

21. The method according to claim 20, wherein said time indication is a connection frame number, CEN, pertaining to a Dedicated Channel Frame Protocol, DCH FP, in a UMTS Terrestrial Radio Access Network, UTRAN.

22. The method according to claim 13, wherein said signaling message is sent from a neighboring RNC.

23. The method according to claim 22, wherein said signaling message is a Node B Application Part, NBAP, message.

24. The method according to claim 1, wherein plural DHO nodes remain after completing the delay reduction procedure.

25. The method according to claim 1, wherein the macro diversity functionality remains after completing the delay reduction procedure.

26. The method according to claim 1, wherein the macro diversity tree consists of only the Node B(s), the RNC, and/or branching nodes.

27. A Radio Network Controller, RNC, adapted for selecting one or more Diversity Handover, DHO, nodes executing a macro diversity functionality in a mobile telecommunication system, wherein the macro diversity functionality is distributed to one or a plurality of DHO nodes such as the RNC, its connected Node Bs in said network and any DHO enabled node(s) therebetween, the RNC comprising:
means for obtaining topology information comprising a hop-by-hop route from the RNC to each of its connected Node Bs and at least one metric for each hop in the route,
means for selecting one or more DHO node(s), whereby said means comprises:
means for forming a macro diversity tree of the routes based on the obtained topology information, and
means for selecting the Node B(s) and/or the RNC and/or other DHO enabled node(s), that result in a best accumulated metric for all potential data flows between the RNC and its connected Node B(s) in the macro diversity tree of routes, as the DHO node(s),
means for checking that a maximum allowed delay is not exceeded for a data path for each of the selected one or more DHO node(s) by using the delay metric from the topology information, and
means for performing, when the maximum allowed delay is exceeded, a delay reduction procedure until the maximum allowed delay is not exceeded, wherein the delay reduction procedure comprises removing one or more already selected DHO nodes from the path.

28. The RNC according to claim 27, wherein the topology information further comprises for each non-DHO enabled node in the topology information an indication of a closest DHO enabled node.

29. The RNC according to claim 27, wherein the means for forming the macro diversity tree comprises:
means for identifying branching nodes in said tree of routes, and
means for identifying the relative interconnections of said branching nodes and the connections to Node Bs and the RNC of said branching nodes.

30. The RNC according to claim 27, wherein the at least one metric comprises the delay metric and a generic cost metric and wherein the means for selecting the DHO Node(s) with the best accumulated metric comprises:
means for selecting the DHO node(s) resulting in the smallest accumulated cost for all potential data flows between the RNC and its connected Node B(s) in the macro diversity tree, as the DHO node(s), and
means for, when the accumulated cost is substantially the same for two or more potential DHO nodes, selecting as the DHO node the potential DHO node that results in the smallest accumulated delay metric for all potential data flows between the RNC and its connected Node B(s) in the macro diversity tree.

31. The RNC according to claim 27, wherein the at least one metric comprises a generic cost.

32. The RNC according to claim 27, wherein the at least one metric comprises the delay metric.

33. The RNC according to claim 32, wherein the RNC further comprises means for combining the delay metric with node synchronisation measurement in order to determine if the maximum allowed delay is exceeded.

34. The RNC according to claim 27, wherein the at least one metric comprises the delay metric and a generic cost metric and wherein the means for selecting the DHO Node(s) with the best accumulated metric comprises:
means for tentatively selecting a potential DHO node,
means for checking whether a delay of a potential data flow between the RNC and one of its connected Node Bs would exceed the maximum allowed delay if it were to traverse the potential DHO node, and
means for selecting the potential DHO node as the DHO node for said potential data flow if said maximum allowed delay is not exceeded.

35. The RNC according to claim 27, wherein the topology information is obtained through manual or semi-automatic management operations in the RNC.

36. The RNC according to claim 27, wherein the topology information is obtained via a link state routing protocol used in a transport network.

37. The RNC according to claim 27, wherein the topology information is obtained by using a traceroute mechanism that allows the RNC to discover the hop-by-hop route to each Node B.

38. The RNC according to claim 27, wherein the topology information is obtained by retrieving the topology information from a neighboring RNC in the network.

39. The RNC according to claim 27, wherein the RNC further comprises:
means for preparing a DHO related signaling message to be conveyed to a DHO tree Node that is a node that is or is planned to be a part of a macro diversity tree,
means for including in the signaling message one or more transport layer addresses and one or more transport bearer reference parameters in order to direct one or more inter-DHO tree node data flows of the macro diversity tree, and
means for sending said signaling message to said DHO tree Node in order to provide DHO related instructions to said DHO tree node.

40. The RNC according to claim 39, wherein the means for including comprises means for replacing the transport layer address and transport bearer reference parameter of the RNC by the transport layer address and transport bearer reference parameter of a DHO tree node that is hierarchically higher than said DHO tree node in a regular signaling message sent to said DHO tree node in order to direct a data flow between said DHO tree node and said higher DHO tree node in the DHO tree node hierarchy.

41. The RNC according to claim 39, wherein the means for including comprises means for including one or more transport layer addresses and one or more transport bearer reference parameters of one or more DHO tree node(s) that are hierarchically lower than said DHO tree node in a signaling message sent to said DHO tree node in order to direct one or more data flows between said first DHO tree node and said one or more lower DHO tree node(s) in the DHO tree node hierarchy.

42. The RNC according to claim 39, wherein said transport layer addresses are IP addresses and said transport bearer reference parameters are UDP ports.

43. The RNC according to claim 39, wherein said transport layer addresses are ATM addresses and said transport bearer reference parameters are SUGR parameters.

44. The RNC according to claim 39, further comprising means for including in the signaling message Quality of Service (QoS) indications for the data flow(s) to be directed.

45. The RNC according to claim 39, further comprising means for including timing parameters in the signaling message to be used in the uplink combining procedure in the DHO tree node receiving said signaling message.

46. The RNC according to claim 39, further comprises means for including a time indication in the signaling message indicating when the DHO related instructions in the signaling message are to be effectuated in the DHO tree node receiving said signaling message.

47. The RNC according to claim 46, wherein said time indication is a connection frame number, CFN, pertaining to a Dedicated Channel Frame Protocol, DCH FP, in a UMTS Terrestrial Radio Access Network, UTRAN.

48. The RNC according to claim 39, wherein said signaling message is a Node B Application Part, NBAP, message.

49. The RNC according to claim 27, wherein plural DHO nodes remain after the means for performing the delay reduction procedure completes performing the delay reduction procedure.

50. The RNC according to claim 27, wherein the macro diversity functionality remains after the means for performing the delay reduction procedure completes performing the delay reduction procedure.

51. The RNC according to claim 27, wherein the macro diversity tree consists of only the Node B(s), the RNC, and/or branching nodes.

52. A method to select one or more DHO (Diversity Handover) nodes to perform macro diversity functionality in a mobile communications network for a mobile terminal, comprising:
   obtaining a topology information of the mobile communications network, wherein the topology information includes a generic cost metric for each hop and a delay metric different than the generic cost metric also for each hop;
   forming route tree for plural data paths from an RNC of the mobile communications network to plural Node Bs of the mobile communications network involved in the macro diversity;
   identifying all branching nodes in the route tree;
   for each branching node, selecting a candidate DHO node, wherein the candidate DHO node corresponding to the branching node is a DHO enabled node with a smallest accumulated generic cost metric between the branching node and the candidate DHO node; and
   for each data path of the plural paths corresponding to a path between the RNC and one of the Node Bs involved in the macro diversity, selecting among the candidate DHO nodes that ensure that an accumulated delay of the data path does not exceed a predetermined maximum allowed delay as the DHO nodes for the path.

53. The method according to claim 52, wherein the act of selecting among the candidate nodes for the data path comprises:
   determining, based on the delay metrics of the hops in the data path, whether the accumulated delay in the data path is greater than the predetermined maximum allowed delay;
   removing one or more candidate DHO nodes for the data path until the accumulated delay does not exceed the predetermined maximum allowed delay; and
   selecting the remaining candidate DHO node or nodes as the DHO node or nodes for the data path.

54. The method according to claim 52, wherein plural DHO nodes are selected.

55. The method according to claim 52, further comprising:
   forming a simplified schematic tree based on the route tree, wherein the simplified schematic tree only includes the RNC, the Node Bs, and the branching nodes,
   wherein the act of identifying all branching nodes includes identifying the branching nodes based on the simplified schematic tree.

\* \* \* \* \*